(12) United States Patent
Aoyama et al.

(10) Patent No.: US 6,280,082 B1
(45) Date of Patent: *Aug. 28, 2001

(54) PROJECTOR AND A MEASURING DEVICE PROVIDED WITH THE SAME

(75) Inventors: Satoshi Aoyama, Toyokawa; Takashi Banno, Nagoya; Tatsuaki Kusatsugu; Eiji Kitagawa, both of Toyokawa, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/460,381

(22) Filed: Dec. 13, 1999

Related U.S. Application Data

(62) Division of application No. 08/751,720, filed on Nov. 18, 1996, now Pat. No. 6,183,129.

(30) Foreign Application Priority Data

Nov. 20, 1995 (JP) .................................................... 7-301457

(51) Int. Cl.⁷ ........................................................ G01J 5/02
(52) U.S. Cl. .................... 374/121; 374/141; 33/DIG. 21; 362/35; 362/259
(58) Field of Search .................................. 374/121, 120, 374/141, 208, 124; 33/241, DIG. 21; 362/35, 259; 356/43, 399

(56) References Cited

U.S. PATENT DOCUMENTS

| 4,315,150 | 2/1982 | Darringer et al. . |
| 4,494,881 | 1/1985 | Everest . |
| 4,955,716 | 9/1990 | Martin . |
| 5,172,978 | 12/1992 | Nomura et al. . |
| 5,368,392 | 11/1994 | Hollander et al. . |
| 5,626,424 | 5/1997 | Litvin et al. . |

FOREIGN PATENT DOCUMENTS

| 3 213 955 | 10/1982 | (DE) . |
| 3 607 679 | 11/1986 | (DE) . |
| 2 203 537 | * 10/1966 | (GB) . |
| 55-36327 | 8/1978 | (JP) . |
| 57-22521 | 2/1982 | (JP) . |
| 60-51654 | 11/1985 | (JP) . |
| 62-12848 | 3/1987 | (JP) . |

* cited by examiner

Primary Examiner—Andrew H. Hirshfeld
(74) Attorney, Agent, or Firm—Burns, Doane, Swecker & Mathis, LLP

(57) ABSTRACT

A projector for use in a measuring device is provided with an emitter which emits a beam of visible light to a measurement object along a predetermined optical axis, a rotary optical member which is operable to change the propagation direction of the visible light beam with respect to the predetermined optical axis in accordance with rotation of the rotary optical member, and a driver which rotates the rotary optical member about a rotation axis. The projector accurately indicates a measurement area on a measurement object in simpler construction.

2 Claims, 23 Drawing Sheets

PROJECTOR AND A MEASURING DEVICE PROVIDED WITH THE SAME

This application is a divisional, of application Ser. No. 08/751,720, filed Nov. 18, 1996 now U.S. Pat. No. 6,183,129.

BACKGROUND OF THE INVENTION

This invention relates to a projector for projecting light to indicate a measurement area and a measuring device provided with such a projector for remotely measuring a surface temperature of an object to be measaured.

In a known projector for use in a radiation thermometer for remotely measuring a surface temperature of a measurement object, a laser beam source is disposed on an optical axis branched from a main optical axis of a measurement optical system for converging a radiant energy from a measurement object, and a point of measurement is indicated by forming a spot projection image on the measurement object by the laser beam source.

However, this projector is merely capable of indicating the center of the measurement area, but is incapable of constantly forming a projection image for a variety of measurement objects. Further, since this device does not indicate the outline of the measurement area, it is difficult to accurately visually confirm the measurement area.

U.S. Pat. No. 5,368,392 discloses a projector for use in a radiation thermometer which is so constructed as to form a ring-shaped projection image indicative of the outline of a measurement area on a measurement object. In this projector, to form the ring-shaped projection image, there is provided a mechanism for mechanically rotating a reflector for reflecting a laser beam. More specifically, in this mechanism, the reflector is inclined with respect to a line parallel with an optical axis of the radiation thermometer. The laser beam is directed at a predetermined angle with respect to the optical axis of the radiation thermometer. The reflector is rotated to reflect the inclined laser beam to produce a ring-shaped projection image on the measurement object. However, the laser beam is reflected with respect to an optical axis different from the optical axis along which the laser beam is emitted. This makes it difficult to accurately produce a ring-shaped projection image.

Also, this U.S. Patent discloses a mechanism for mechanically rotating the laser beam source about an optical axis. However, the direct rotation of laser beam source makes the construction of the projector complicated.

Also, this projector is merely capable of indicating the outline of the measurement area by the ring-shaped projection image, but incapable of indicating the center of the measurement area. Accordingly, the use of this projector is not suitable in the case that the fine adjustment of the optical axis is required.

SUMMARY OF THE INVENTION

It is an object of the present invention to provide a projector and a measuring device provided with a projector which have overcome the problems residing in the prior art.

It is another object of the present invention to provide a projector and a measuring device provided with a projector which can accurately indicate a measurement area on a measurement object and have an improved operability in simpler construction.

According to one aspect of the present invention, a projector for use in a measuring device comprises: an emitter which emits a beam of visible light to a measurement object along a predetermined optical axis; a rotary optical member which is operable to change the propagation direction of the visible light beam with respect to the predetermined optical axis in accordance with rotation of the rotary optical member; and a driver which rotates the rotary optical member about a rotation axis.

It may be appreciated that the rotary optical member is operable to transmit the, visible light beam therethrough, and the rotary optical member is formed with a refractive portion operable to refract the visible light beam at a predetermined angle with respect to the predetermined optical axis.

The refractive portion may be defined by an inclined principle plane intersecting the predetermined optical axis at a predetermined angle.

The rotary optical member may be further formed with a nonrefractive portion which allows the visible light beam to propagate along the predetermined optical axis.

The refractive portion may be defined by an inclined principle plane intersecting the predetermined optical axis at a predetermined angle. The nonrefractive portion may be defined by a through hole formed in a position of the rotary optical member which the predetermined optical axis passes through. Also, the nonrefractive portion may be defined by a plurality of through holes formed in positions of the rotary optical member which the predetermined optical axis passes during the rotation of the rotary optical member.

Further, the nonrefractive portion may be defined by a planar portion formed in a position of the rotary optical member which the predetermined optical axis passes through, the planar portion having incidence and emergence principle planes normal to the predetermined optical axis. Also, the nonrefractive portion may be defined by a plurality of planar portions formed in positions of the rotary optical member which the predetermined optical axis passes during the rotation of the rotary optical member, the planar portion having incidence and emergence principle planes normal to the predetermined optical axis.

The rotary optical member may be formed with a first refractive portion operable to refract the visible light beam at a first predetermined angle with respect to the predetermined optical axis, and a second refractive portion operable to refract the visible light beam at a second predetermined angle with respect to the predetermined optical axis, the second predetermined angle being different from the first predetermined angle.

The first refractive portion may be defined by a first inclined principle plane intersecting the predetermined optical axis at a first predetermined angle. The second refractive portion may be defined by a second inclined principle plane intersecting the predetermined optical axis at a second predetermined angle different from the first predetermined angle.

The rotary optical member may be provided with a first member being formed with a first refractive portion having a first refractive angle; a second member being formed with a second refractive portion having a second refractive angle; and a changer which is operable to shift a relative position of the first and second member to change a combined refractive angle of the first and second refractive angles. The first and second members each may be preferably an optical prism.

It may be appreciated that the rotary optical member is operable to reflect the visible light beam, and is formed with a reflective portion operable to reflect the visible light beam at a predetermined angle with respect to an axis normal to the predetermined optical axis. The reflective portion may be defined by an inclined reflective plane intersecting the predetermined optical axis at a predetermined angle.

The emitter may be preferably provided with a semiconductor laser operable to intermittently emit light at a frequency higher than a critical flicker frequency. Further, there may be provided a detector which detects a rotation of the rotary optical member; and a controller which is responsive to the detector and controls the emitter so as to emit light at a frequency which is a multiple of a rotation frequency of the rotary optical member.

According to another aspect of the present invention, a projector for use in a measuring device comprises: an emitter which emits a beam of visible light to a measurement object along a predetermined optical axis; a rotary optical member which is operable to transmit the visible light beam therethrough, and formed with a refractive portion operable to refract the visible light beam at a predetermined angle with respect to the predetermined optical axis and a nonrefractive portion operable to allow the visible light beam to propagate along the predetermined optical axis; and a driver which rotates the rotary optical member about a rotation axis.

Further, there may be preferably provided a controller which controls the driver, the controller having a first control mode of activating the driver to rotate the rotary optical member and a second control mode of suspending the driver to keep the rotary optical member at a position that the nonrefractive portion is on the predetermined optical axis; and a control mode changer which changes over the first and second control modes.

According to still another aspect of the present invention, a measuring device for remotely measuring a characteristic of an object, comprises: a measurement sensor; a measurement optical system for converging a radiant energy from the object to the measurement sensor, the measurement optical system having a first optical axis passing through the measurement sensor; a projector for projecting a visible light to the object to indicate a measurement area of the measurement sensor, the projector including: an emitter which emits a beam of visible light to the object in a second optical axis; a rotary optical member which is operable to change the propagation direction of the visible light beam with respect to the second optical axis in accordance with rotation of the rotary optical member; a driver which rotates the rotary optical member about a rotation axis; and a projection optical system for shifting the second optical axis so as to be coincident with the first optical axis.

The measurement optical system may be provided with a lens whose focal length is changeable. The rotary optical member may be provided with a first member being formed with a first refractive portion having a first refractive angle; a second member being formed with a second refractive portion having a second refractive angle; and a changer which is operable to shift a relative position of the first and second members to change a combined refractive angle of the first and second refractive angles in accordance with the focal length of the lens.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 8:
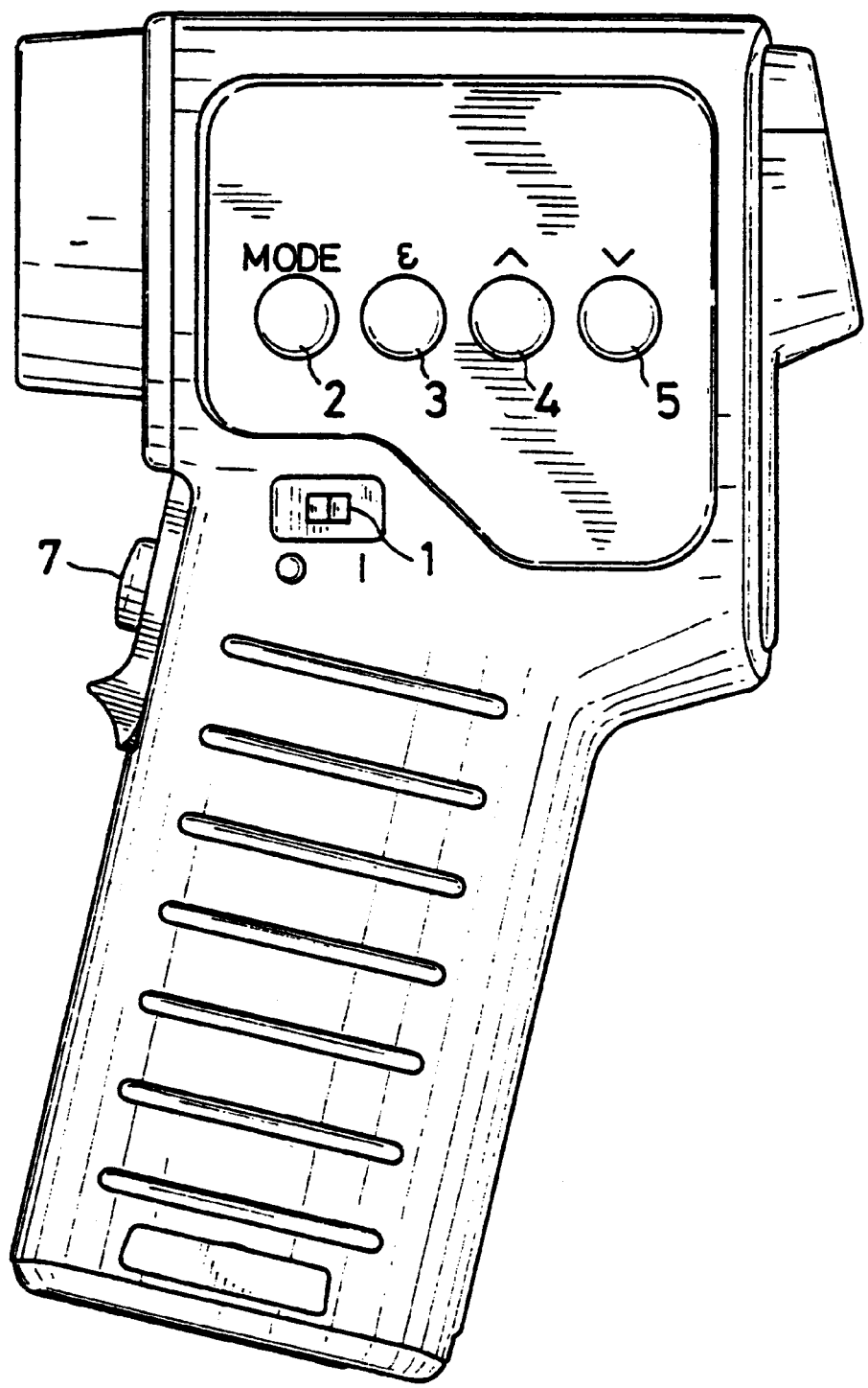
FIG. 8 is a side view of the radiation thermometer.
Figure 9:
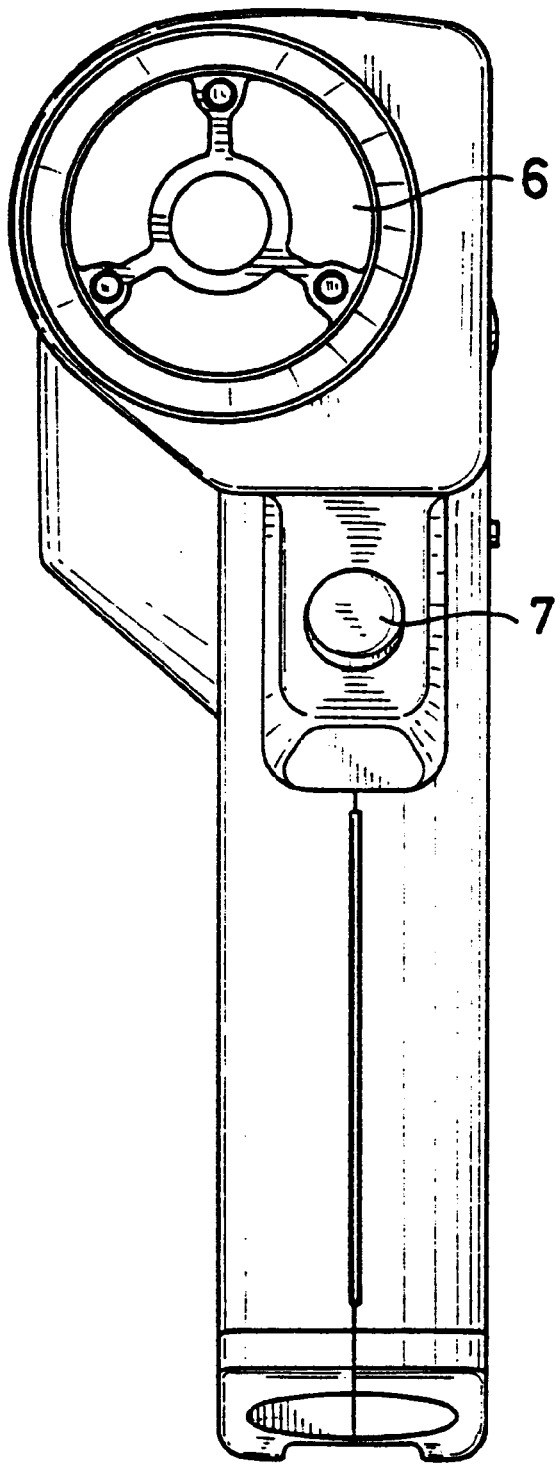
FIG. 9 is a front view of the radiation thermometer.
Figure 10:
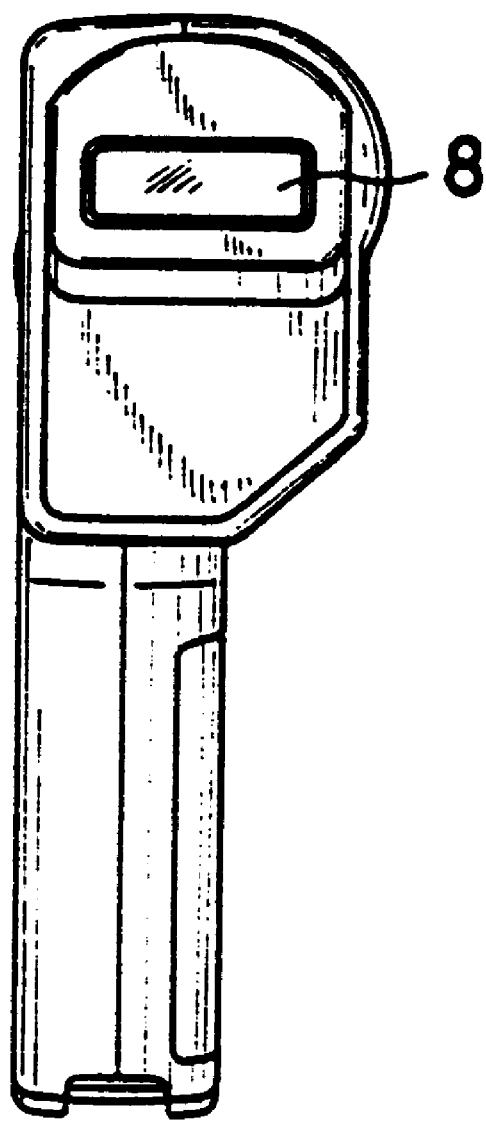
FIG. 10 is a rear view of the radiation thermometer.

FIGS. 8 to 10 show an external configuration of a radiation thermometer embodying the invention, wherein FIG. 8 shows a side portion of the thermometer, FIG. 9 shows a front portion of the thermometer and FIG. 10 is a rear portion of the thermometer.

The radiation thermometer includes, as shown in FIG. 8, a measuring unit at its upper part and a grip at its lower part. At the measuring unit, a main switch 1 for turning the thermometer on and off is disposed substantially in the middle of one side surface thereof. Above the main switch 1, a mode setting switch 2, an emissivity setting switch 3 and operation switches 4, 5 are disposed. As shown in FIG. 9, a measurement window 6 is formed at an upper part of the front surface of the thermometer. At the grip, a retractable measurement button 7 is provided at its front surface, and an indicator 8 for displaying a measurement result and the like is formed on its rear surface as shown in FIG. 10.

The mode setting switch 2 is used to set a desired measurement mode to be described below, and the emissivity setting switch 3 is used to set an emissivity corresponding to a measurement object. The operation switches 4, 5 are an up-key and a down-key, respectively and used to switch modes when the desired measurement mode is set and to increase and decrease the numerical value of the emissivity to be set.

The measurement window 6 is made of a glass, a film or like material which permits the transmission of infrared rays, and permits a radiant energy radiated from the measurement object to be incident on the thermometer. The measurement button 7 is turned on while the radiation thermometer is directed to the measurement object so as to start a measurement. The indicator 8 includes a liquid crystal display or the like, and displays an information concerning the measurement such as the measurement value, the set emissivity and measurement mode.

Figure 1:
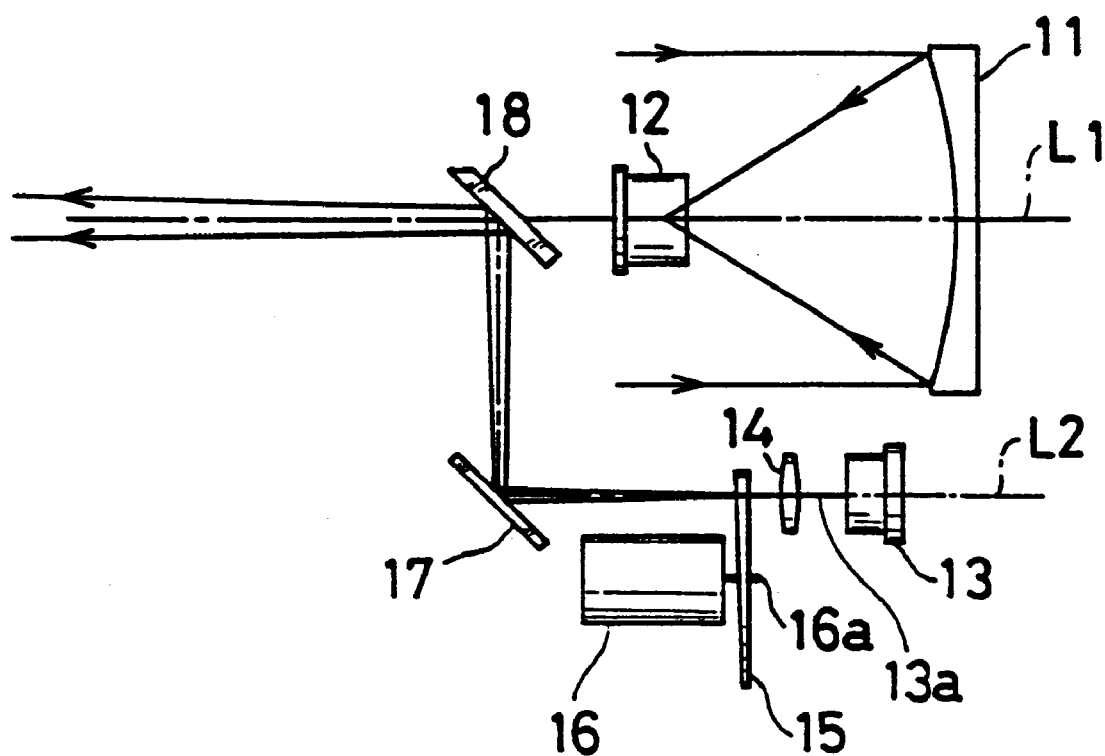
FIG. 1 is a schematic diagram showing a construction of a radiation thermometer embodying the present invention.

Referring now to FIG. 1, the radiation thermometer includes a concave mirror 11 and an infrared sensor 12 which construct a measurement system, a light emitter 13, a condenser lens 14, an optical member 15, a motor 16 and reflectors 17, 18 which construct a projection system.

The concave mirror 11 gathers radiant energy radiated from the measurement object along an optical axis L1 and is employed in the measurement system. The infrared sensor 12 is disposed in such a position that its light receiving surface is located at a focal point of the concave mirror 11, and includes a thermopile for receiving infrared rays. The infrared sensor 12 generates a voltage signal of a level in proportion to an amount of received light, and is connected with an unillustrated calculation unit to calculate the surface temperature of the measurement object based on a detected level.

The light emitter 13 includes a laser diode or the like, and outputs a laser beam in a visible spectrum along an optical axis L2. The condenser lens 14 makes the visible light output from the light emitter 13 parallel with the optical axis L2. The motor 16 is a pulse motor or like motor disposed in the vicinity of the optical axis L2 such that its rotary shaft 16a is parallel with the optical axis L2.

Figure 2:
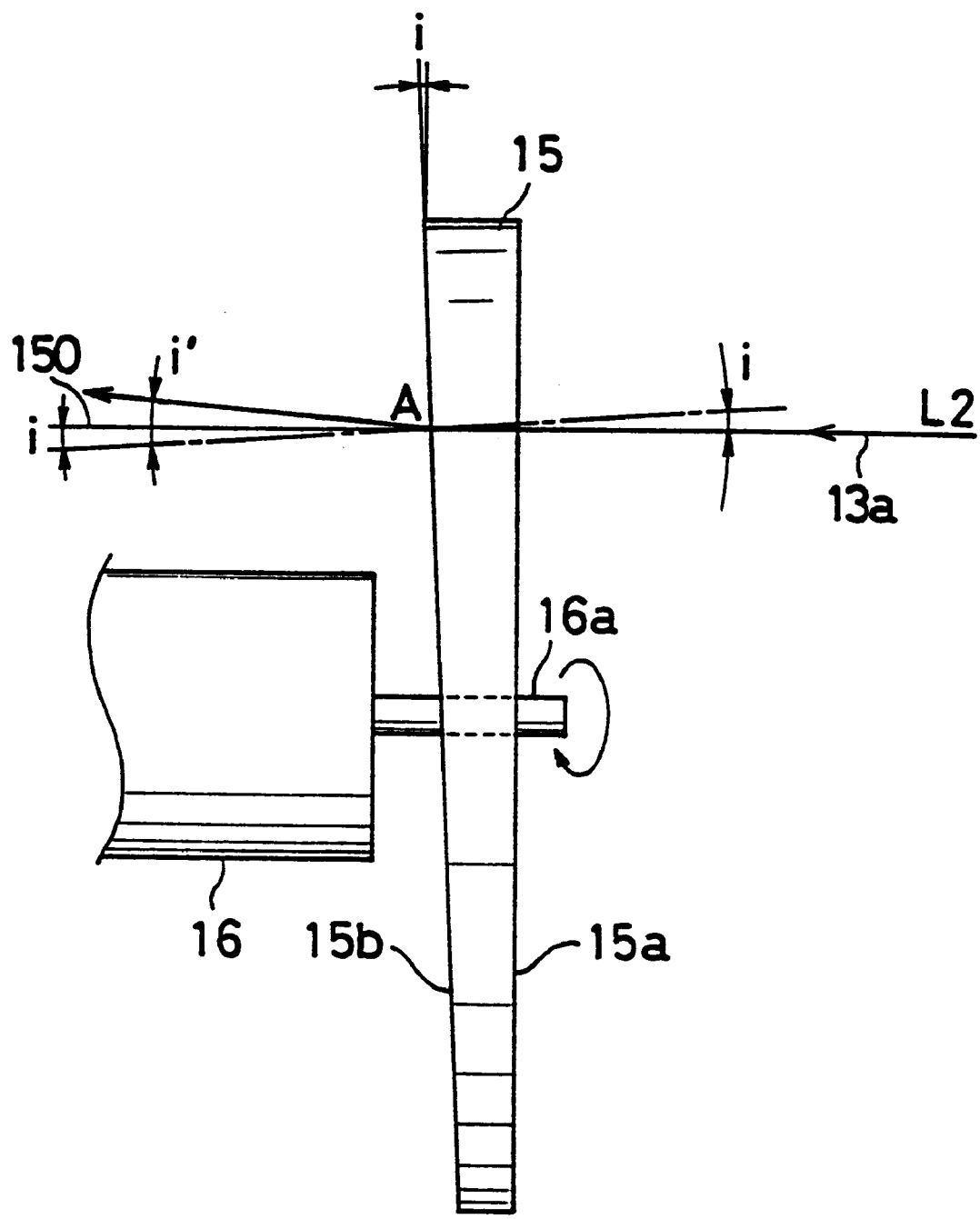
FIG. 2 is a schematic side diagram showing an arrangement of an optical member provided in the radiation thermometer.
Figure 3:
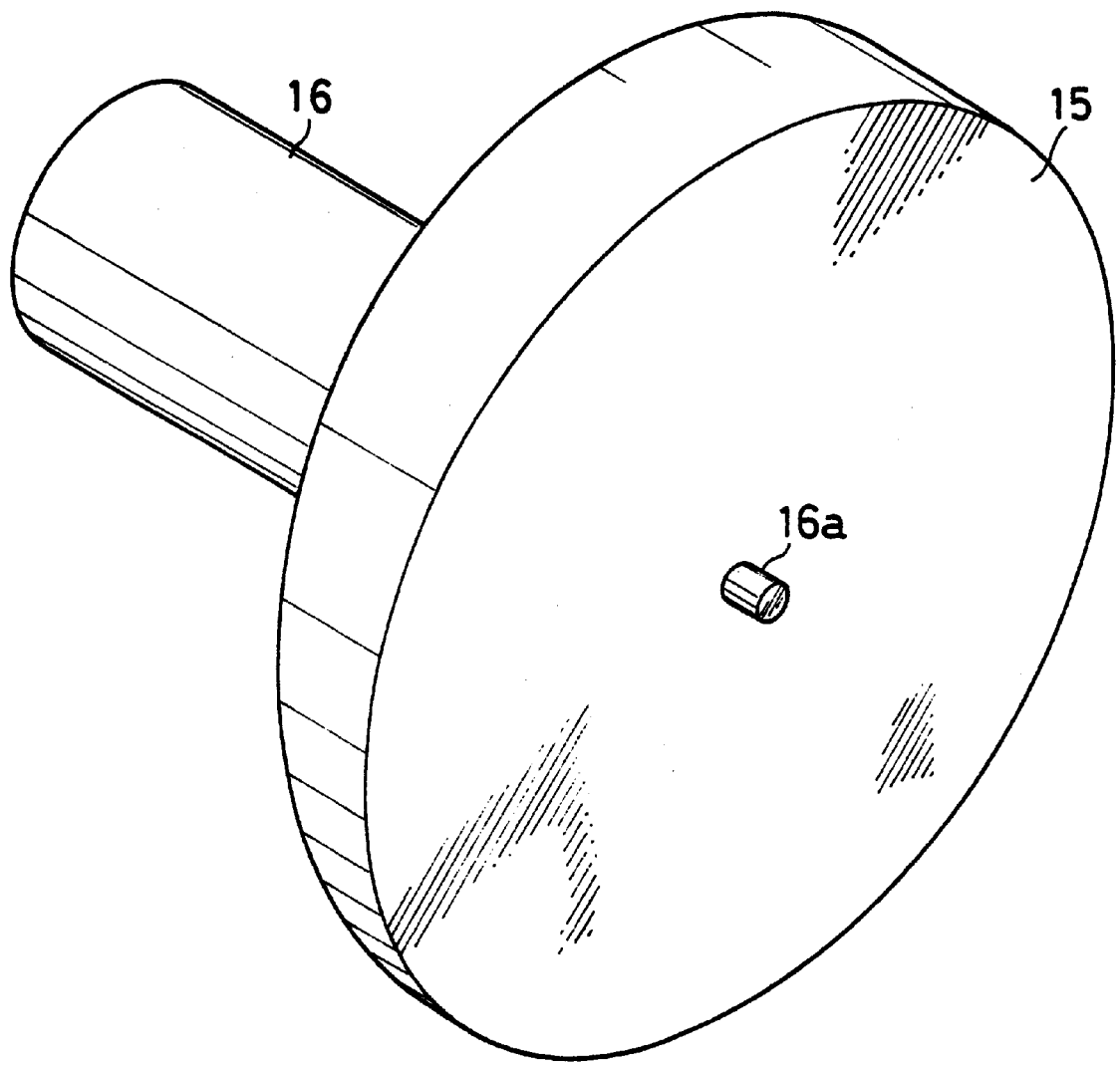
FIG. 3 is a perspective view showing the optical member.

The optical member 15 is, as shown in FIGS. 2 and 3, a disk-shaped transparent optical prism and its center is secured to the rotary shaft 16a. The opposite principle planes of the optical member 15 are not parallel to each other. In other words, a principle plane 15a is normal to the optical axis L2, while a principle plane 15b is inclined with respect to a plane normal to the optical axis L2 by an angle i. Accordingly, the thickness of the optical member between the principle plates 15a and 15b continuously varies in one direction (at a specified inclination).

FIG. 2 is a side view of the optical member 15 when its thickest portion is located at an upper end and its thinnest portion is located at a bottom end.

When the optical member 15 is rotated about the rotary shaft 16a, an angle formed between the principle plane 15b and the plane normal to the optical axis L2 continuously changes between −i and i.

Figure 4:
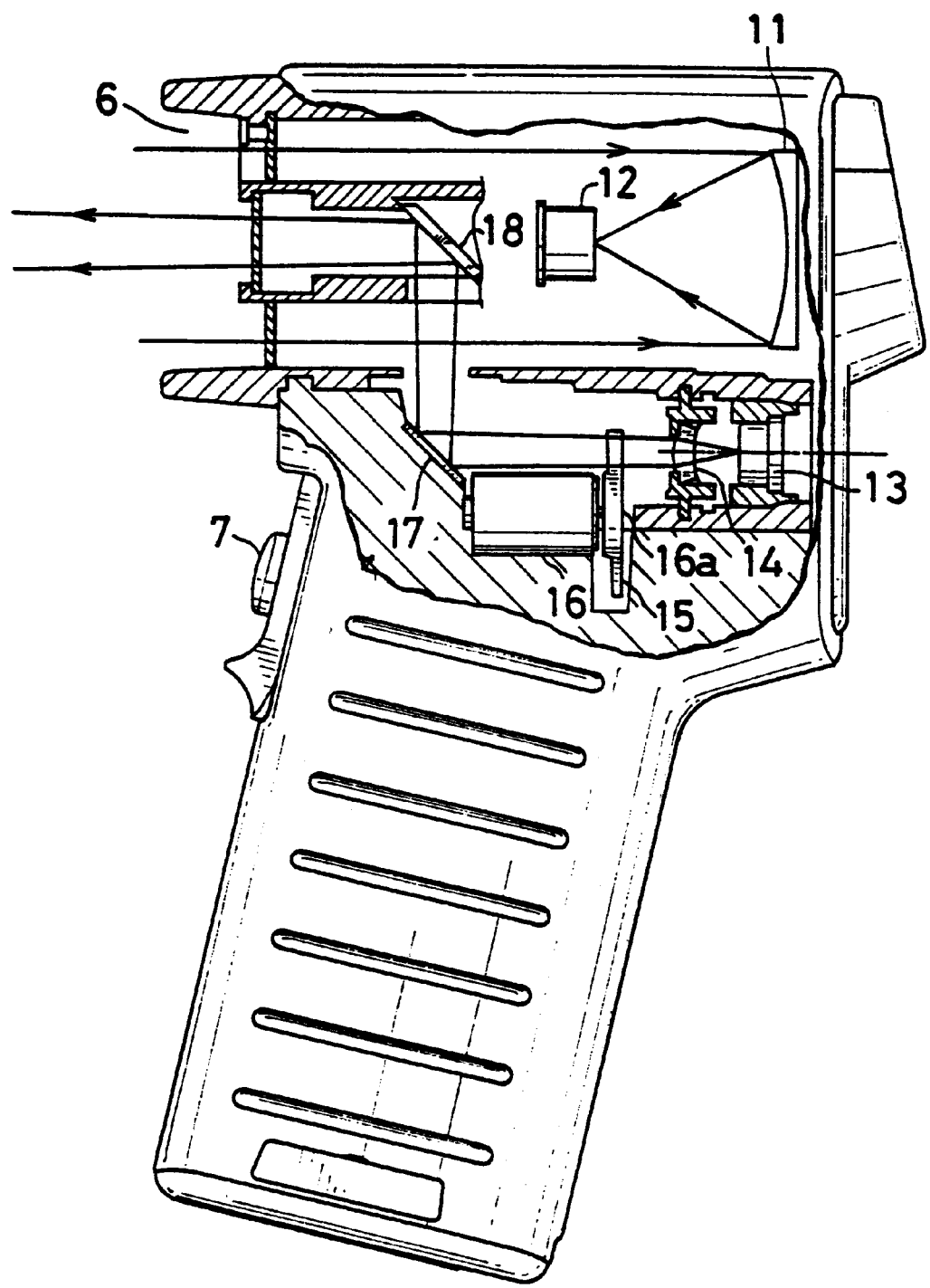
FIG. 4 is a side view of the radiation thermometer, a housing of the thermometer being partially cut away to show an interior construction of the radiation thermometer.

Referring back to FIG. 1, the reflectors 17, 18 act to reflect the beam having transmitted through the optical member 15 in such a manner that the optical axis L2 becomes coincident with the optical axis L1. The reflectors 17, 18 cause the beam to propagate through the measurement window 7 as shown in FIG. 4.

Next, an optic path of the beam is described. A beam 13a emitted from the light emitter 13 is gathered into a parallel beam by the condenser lens 14 and is incident on the optical member 15 along the optical axis L2 as shown in FIG. 2. At this time, since the beam 13a is incident on the principle plane 15a of the optical member 15, i.e., an incidence surface in a direction normal thereto, it propagates straight without being refracted. Since the principle plane 15b of the optical member 15, i.e., an emergence surface is inclined with respect to the plane normal to the optical axis L2 by only the angle i, the beam 13a is refracted at a point of emergence in a direction of inclination, i.e., a direction in which the thickness of the optical member 15 increases, and emerges at an angle i' with respect to a normal line 150 to the principle plane 15b of the optical member 15.

Hereafter, if n denotes an index of refraction of the optical member 15, the relationship of i and i' is defined as follows by Snell's laws of refraction.

$$n \times \sin i = \sin i', \qquad \text{[Equation 1]}$$

that is, $$i' = \sin^{-1}(n \times \sin i) \qquad \text{[Equation 2]}$$

Figure 5:
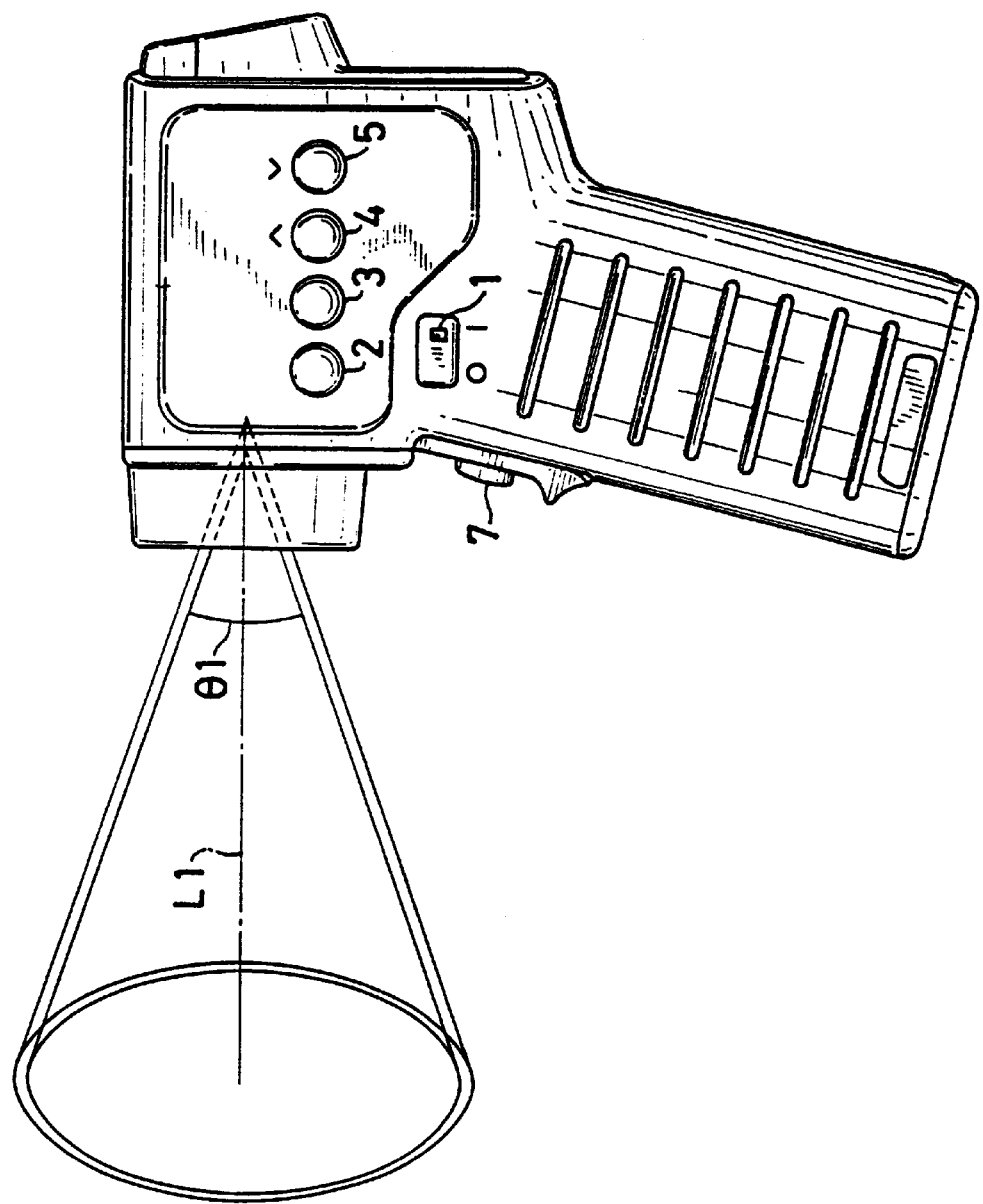
FIG. 5 is a diagram showing an optical image formed by a beam emitted from the radiation thermometer.

When the optical member 15 is rotated by driving the motor 16, the inclination of the principle plane 15b changes. Accordingly, the beam 13a emerging from the optical member 15 rotates while forming an angle (i'−i) with respect to the optical axis L2. Thus, the beam 13a rotates while forming a cone with the optical axis L1 as its center of rotation as shown in FIG. 5. An angle of projection θ1 of the rotated beam is 2×(i'−i). As a result, a ring-shaped projection image is formed on the measurement object.

In this way, the ring-shaped projection image is formed on the measurement object by rotating the optical member 15. Accordingly, by suitably setting the angle of inclination i of the optical member 15, the outline of the measurement area on the measurement object can be indicated.

Since the optical member 15 is reversible, the same effects can be obtained even if the principle planes 15a, 15b are reversed.

Next, the luminance modification of the beam 13a emitted from the light emitter 13 is described.

In the case that a semiconductor laser such as a laser diode is used as the light emitter 13, it is necessary to take the following two points into consideration.

(1) A power capacity has to be increased since a drive current is large.

(2) It is necessary to suppress the amount of laser beam to be emitted to a specified level to protect a human body, particularly eyes. However, since a red laser generally in use has a low luminosity factor, it is difficult to ensure a sufficient brightness with this specified level.

These points are improved by the following techniques (1) and (2) in this embodiment.

(1) By being intermittently driven by a pulse, the light emitter 13 is caused to emit light at a frequency higher than a critical flicker frequency where the eyes do not respond. For example, if a duty cycle at which the light emitter 13 is turned on and off by the pulse is 50%, the consumption of current can be reduced substantially to half.

(2) By setting an appropriate rotation frequency of the motor 16 and a pulse drive frequency of the technique (1), the luminance of the light to be projected on the measurement object to form a ring-shaped image can be modified. Human eyes are likely to see the light of a higher luminance level better. The specified level of the light emission amount is considered to be an average light emission amount within a specified period. By the luminance modification, the ring-shaped projection image can be made brighter while the average light emission amount is suppressed below the specified level.

Figure 6:
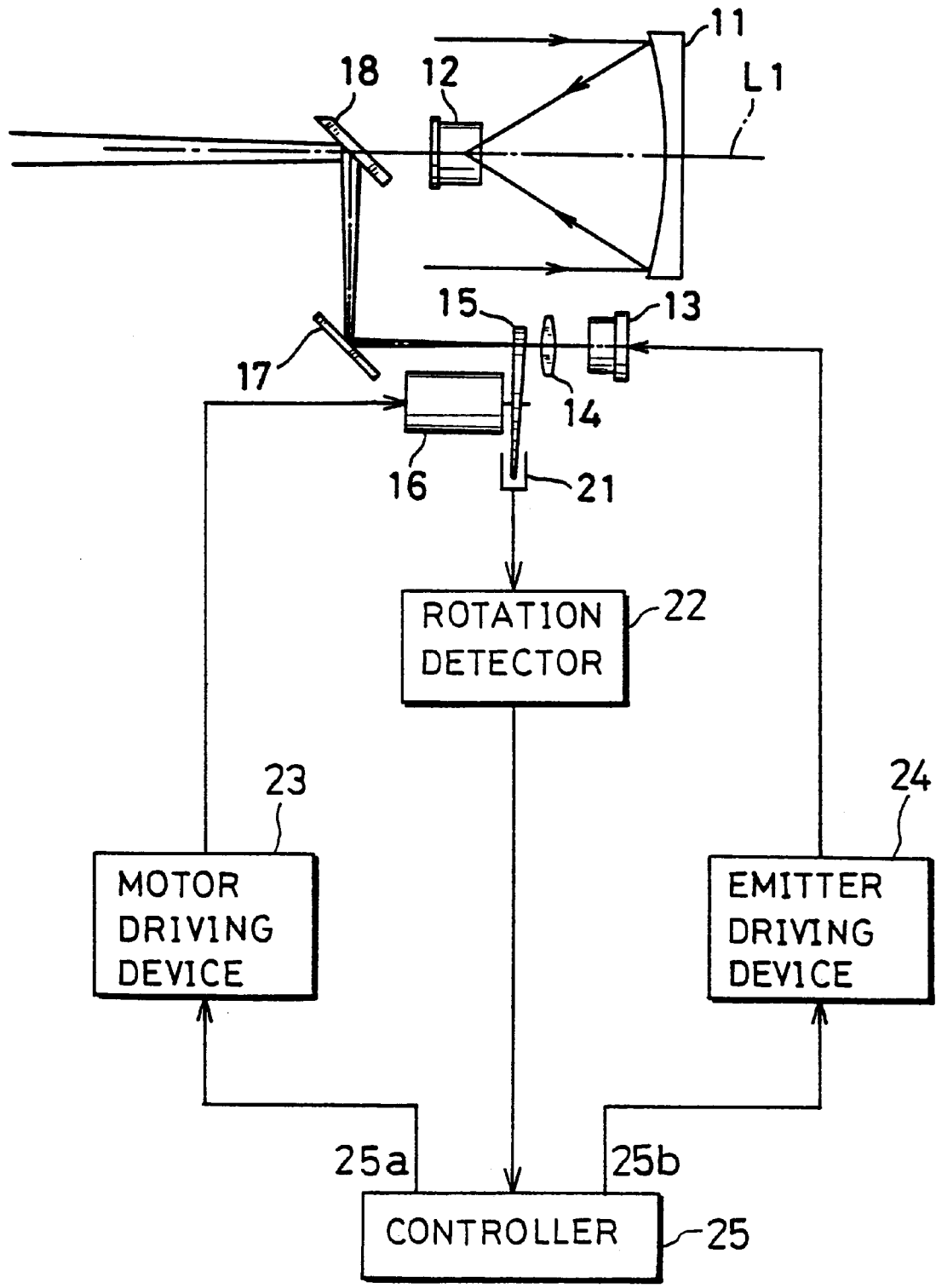
FIG. 6 is a block diagram showing a construction of a control system or controlling a light emitter and a motor provided in the radiation thermometer.
Figure 7:
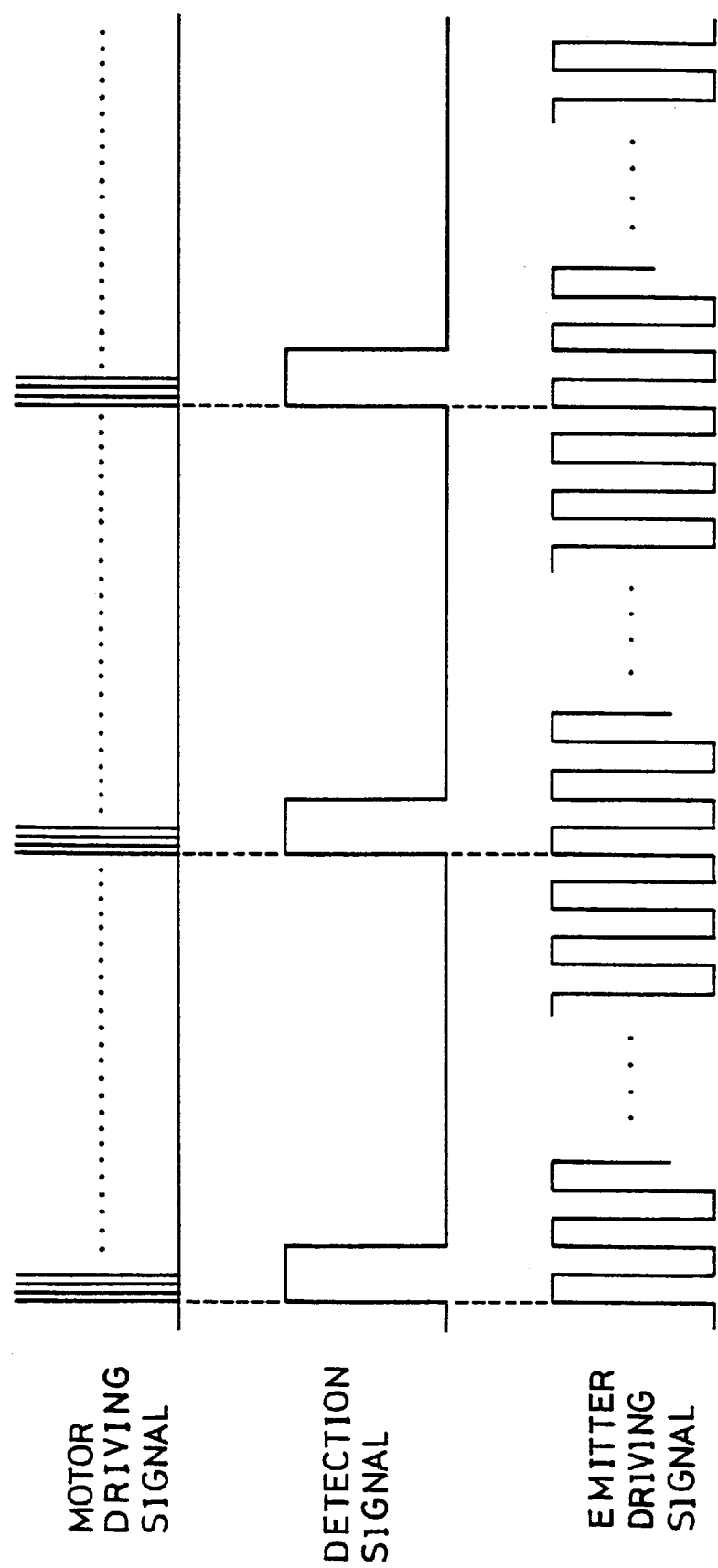
FIG. 7 is a timing chart of a motor drive signal, a detection signal of the optical member, and a drive signal of the light emitter.

Constructions for implementing the techniques (1) and (2) are described here. FIG. 6 is a block diagram showing a construction of a control system for the light emitter 13 and the motor 16, and FIG. 7 is a timing chart of a drive signal of the motor 16, a rotation detection signal of the optical member 15, and a drive signal of the light emitter 13.

This control system is provided with a rotation sensor 21, a rotation amount detector 22, a motor driving device 23, an emitter driving device 24 and a controller 25.

The rotation sensor 21 includes a photointerrupter or the like. The rotation amount detector 22 detects the rotation of the optical member 15 using a signal from the rotation sensor 21, and outputs a detection signal 22a to the controller 25 upon each turn of the optical member 15.

The motor driving device 23 and the emitter driving device 24 are adapted to supply a drive current to the motor 16 and the light emitter 13, respectively.

The controller 25 includes a CPU or the like, and performs a feedback control by outputting a pulse control signal 25a to the motor driving device 23 based on the detection signal 22a of the rotation amount detector 22 to make the rotation of the motor 16 constant. The controller 25 outputs a pulse control signal 25b to the emitter driving device 24 to cause the light emitter 13 to emit light at a frequency which is a multiple of the rotation frequency of the motor 16.

If the phase of the light emission pulse frequency and that of the rotation frequency of the optical member 15 shift when the light emitter 13 is caused to emit light by the pulse, the luminance of the beam 13a is modified. As a result, a phenomenon may occur where the ring-shaped projection image formed on the measurement object looks unstably swaying or looks rotating in a specified direction.

However, in this embodiment, the phase of the light emission pulse frequency of the light emitter 13 and that of the rotation frequency of the optical member 15 are caused to correspond with each other by driving the light emitter 13 at the frequency which is a multiple of the rotation frequency of the motor 16. Accordingly, the occurrence of the above phenomenon is prevented, thereby enabling a stable ring-shaped projection image to be formed.

If the rise timing of the control signal 25a output to the motor driving device 23 and that of the control signal 25b output to the emitter driving device 24 are synchronized, a more stable ring-shaped projection image can be obtained.

Thus, by implementing the techniques (1) and (2), the consumption of current can be reduced and the ring-shaped projection image can be made brighter.

As mentioned above, in this embodiment, the ring-shaped projection image is formed by rotating the optical member 15 having the inclined principle plane 15b. This will simplify the construction of the projector and ensure an accurate projection image.

Figure 11:
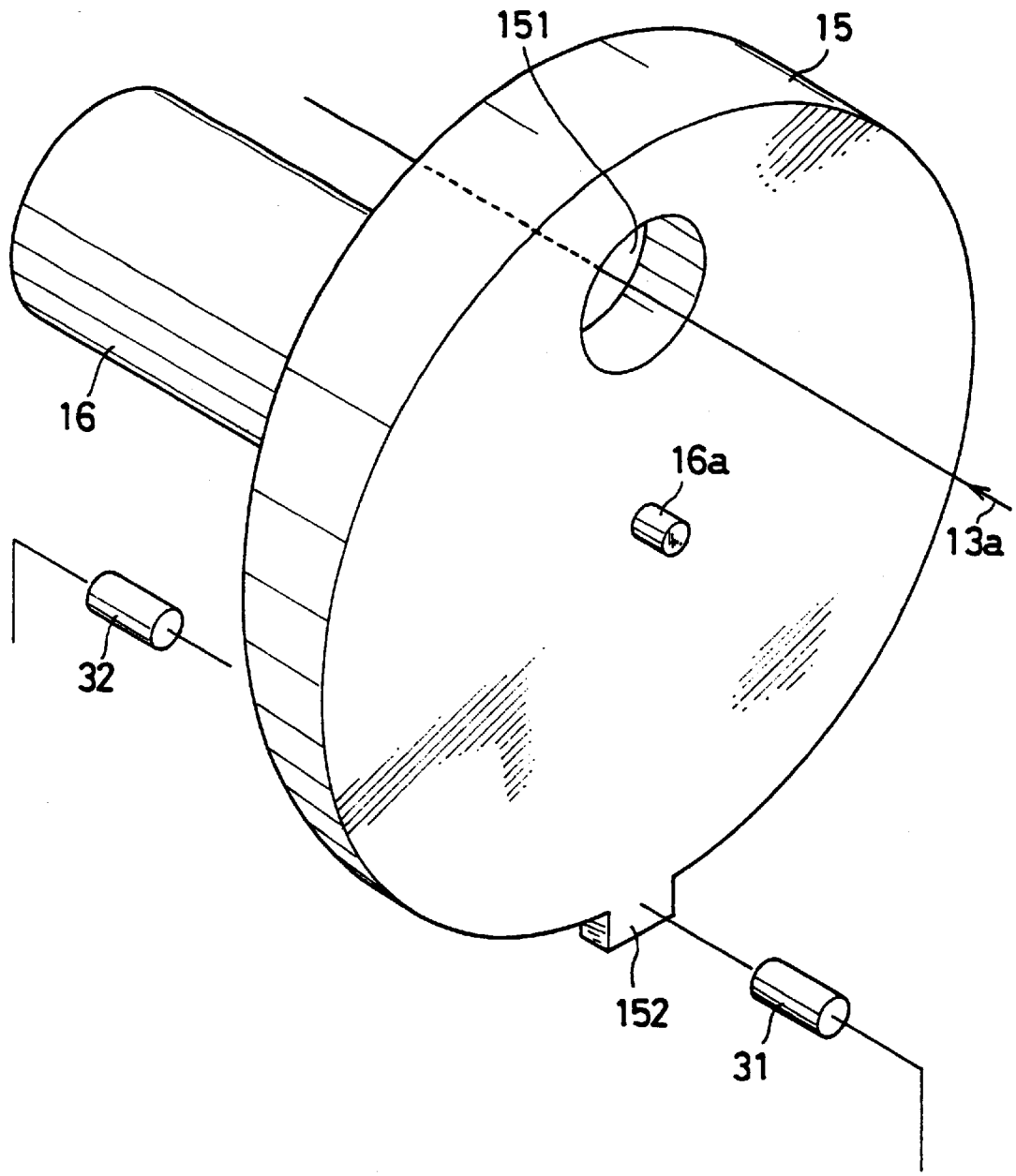
FIG. 11 is a perspective view showing an arrangement of an optical member of a first modified projector.
Figure 12:
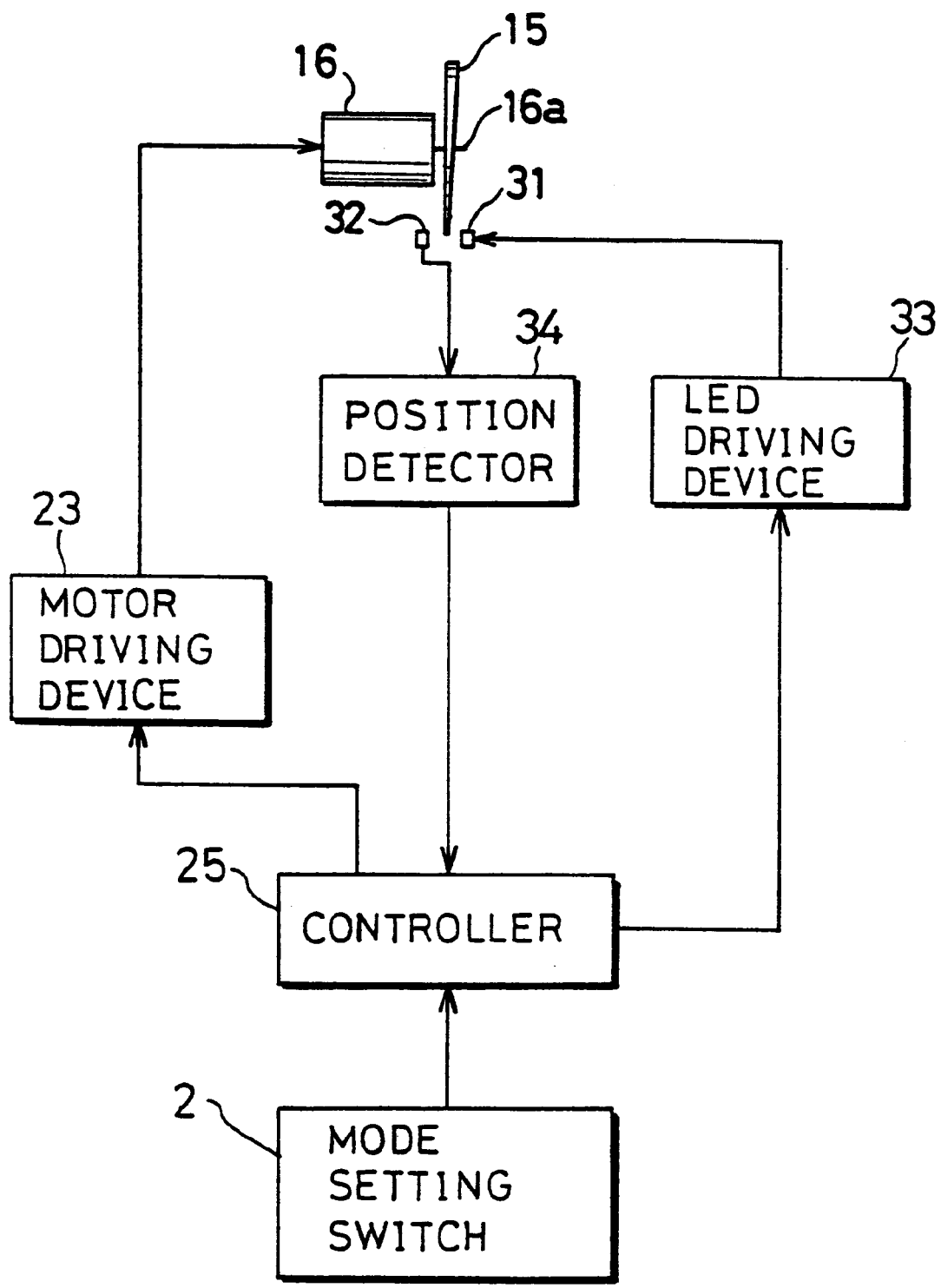
FIG. 12 is a block diagram showing a construction of a control system for controlling a light emitter and a motor provided in the first modified projector.

Next, a first modification of the inventive radiation thermometer is described. FIG. 11 is a perspective view showing a configuration of an optical member 15 of the first modified projector, and FIG. 12 is a block diagram of a control system for a motor 16. It should be appreciated that the same elements as the aforementioned basic embodiment are identified by the same reference numerals, and only points different from the basic embodiment are described hereafter.

In the first modified projector, as shown in FIG. 11, the optical member 15 is formed with a through hole 151 in a part of an area where the beam 13a passes, i.e., in a position on a circle having the rotation axis 16a as a center and a distance between the rotation axis 16a and the optical axis L2 as a radius, and is also formed with a light blocking portion 152 projecting from its periphery.

A light-emitting diode (LED) 31 and a photodiode 32 are disposed before and after the optical member 15 such that they are opposed to each other with a trace of rotation of the blocking portion 152 therebetween and that a light from the LED 31 to the photodiode 32 is blocked by the light blocking portion 152 when the optical member 15 is rotated and the through hole 151 is located on the optical axis L2.

A control system of the first modified projector, as shown in FIG. 12, provided with a mode setting switch 2, the LED 31, the photodiode 32, an LED driving device 33, a position detector 34, a motor driving device 23 and a controller 25.

The mode setting switch 2 is operated to set a rotation mode for rotating the optical member 15 (a mode for projecting light to form a spot image or a ring-shaped image on the measurement object) and a stop mode for stopping the rotation of the optical member 15 in a position where the through hole 151 coincides with or is located on the optical axis L2.

The LED driving device 33 supplies a drive current to the LED 31 to cause the LED 31 to emit light. The position detector 34 outputs a position detection signal to the controller 25 based on whether or not it has received light from the LED 31.

The controller 25 controls the light emission by the LED 31 by outputting a control signal to the LED driving device 33 and discriminates, based on the position detection signal from the position detector 34, whether or not the optical member 15 is in the position where the through hole 151 coincides with the optical axis L2.

When the rotation mode is set by the mode setting switch 2, the controller 25 causes the optical member 15 to rotate by outputting the control signal to the motor driving device 23. On the other hand, when the stop mode is set by the mode setting switch 2, the controller 25 causes the optical member 15 to stop rotation by outputting the control signal to the motor driving device 23 upon the receipt of the position detection signal from the position detector 34.

In the first modified projector, the optical member 15 is formed with the through hole 151 which permits the beam 13a from the light emitter 13 to propagate straight without being refracted. By stopping the optical member 15 in the position where the beam 13a passes through the through hole 151 and forming a spot projection image at the center of the measurement area, the center of the measurement area can be easily and accurately confirmed and instructed. If the beam is projected such that the ring-shaped projection image is seen on the measurement object as in the basic embodiment, brightness per unit is reduced. Accordingly, when the measurement object is at a long distance or has a low index of reflection, it may be difficult to confirm the measurement area. However, since the spot projection image is formed on the measurement object to enhance the brightness of the projection image, such an event can be prevented. Further, since the center of the measurement area is indicated, the optical axis L1 of the concave mirror 11 (of the measurement optical system) can be accurately positioned with respect to the measurement area.

Further, if the optical member 15 is used while being rotated, the ring-shaped projection image indicative of the outline of the measurement area and the spot projection image indicative of the center position of the measurement area are formed. As compared with the aforementioned basic embodiment, the measurement area can be more easily and accurately confirmed.

Figure 13:
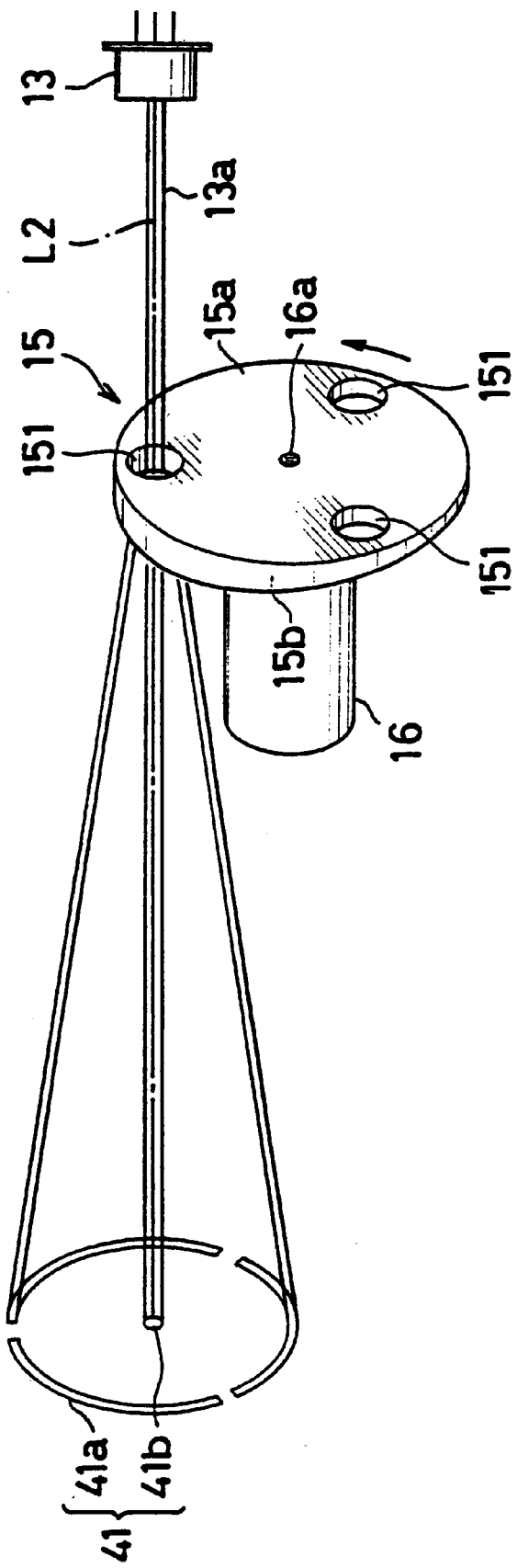
FIG. 13 is a diagram showing an optical image projected on a measurement object when using a first optical member variation which is formed with three through holes on the same circle.

FIG. 13 shows a first variation of the optical member 15 in which a plurality of through holes 151 is formed. Also, FIG. 13 shows a projection image formed on a measurement object when the optical member 15 formed with three optical elements 151 located on the same circle and substantially equally spaced in a, circumferential direction. It should be noted that reflectors and the like are omitted from FIG. 13 in order to simplify the description.

A projection image 41 on the measurement object is comprised of a ring-shaped image 41a formed by refracting the beam 13a by the optical member 15 and a spot image 41b formed by the beam 13a having propagated straight through the through holes 151.

By increasing the number of the through holes 151, the luminance of the spot image indicative of the center of the measurement area can be advantageously increased even if the optical member 15 is continuously rotated.

In FIGS. 11 and 13, instead of forming the through hole(s) 151, there may be provided planar portion(s) formed such that the principle planes thereof are both normal to the optical axis L2. In such a case, since the beam 13a is permitted to propagate straight as in the case where the through hole(s) 151 is/are formed, the same effect can be obtained. As described above, these effects can be obtained in a simpler construction, i.e., by providing the through hole(s) 151 or the planar portion(s).

In the first modified thermometer, the ring image 41a is partly missing as shown in FIG. 13 since no beam is projected for the formation of the ring image 41a while the spot image 41b is formed. This does not cause any substantial problem in indicating the measurement area. The optical member 15 is not limited to an optical prism as shown in FIG. 2, but any optical member can be used provided its thickness is continuously varying. For example, optical members having curved principle planes such as lenses may also be used.

Figure 14:
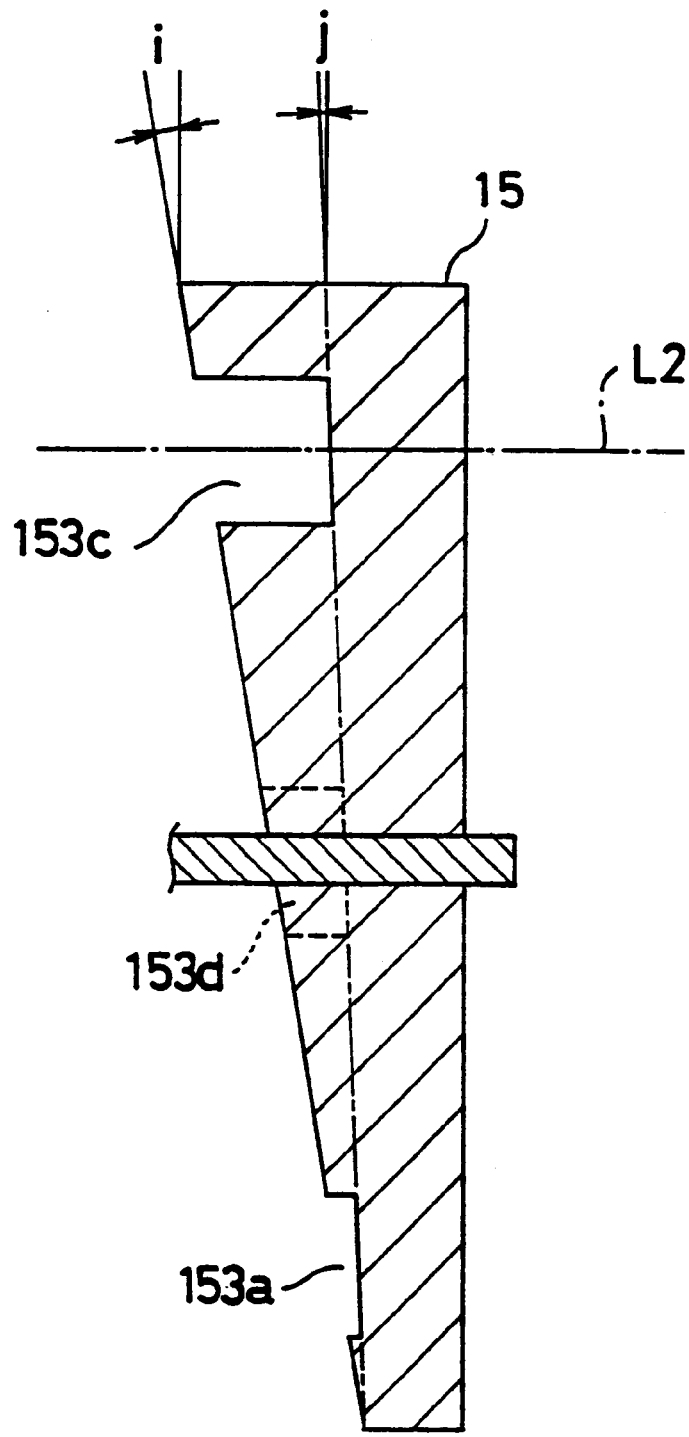
FIG. 14 is a sectional view showing a configuration of a second optic member variation.
Figure 15:
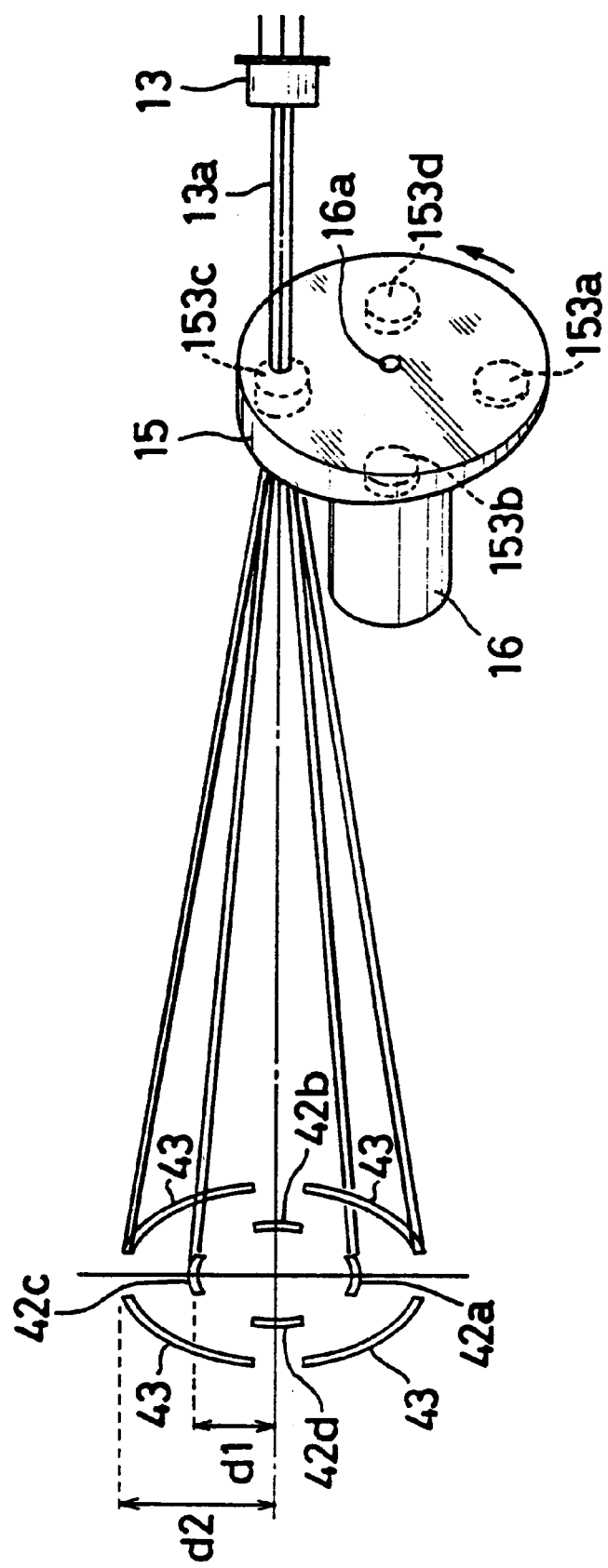
FIG. 15 is a perspective view showing an optical image projected on the measurement object when using the second optical member variation.
Figure 16:
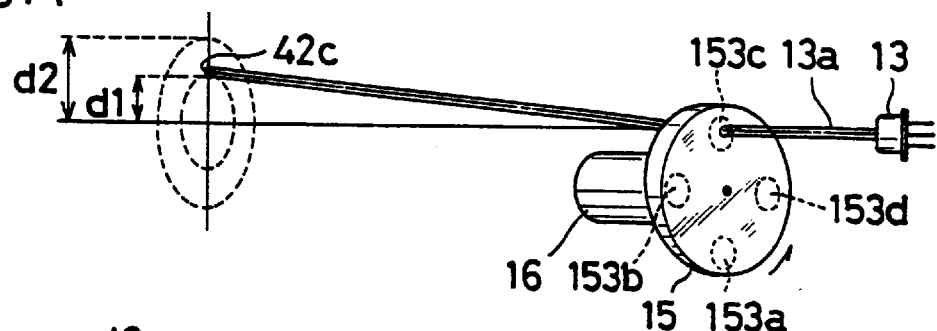
FIGS. 16A to 16E are diagrams showing a propagation directin of a beam light which changes as the second optical member variation is rotated.
Figure 16:
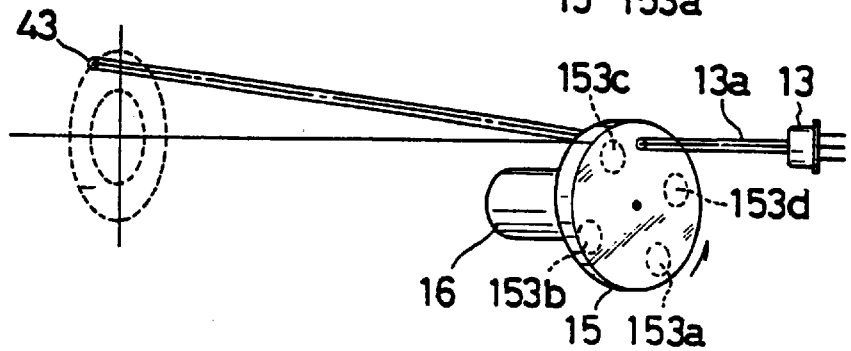
Figure 16:
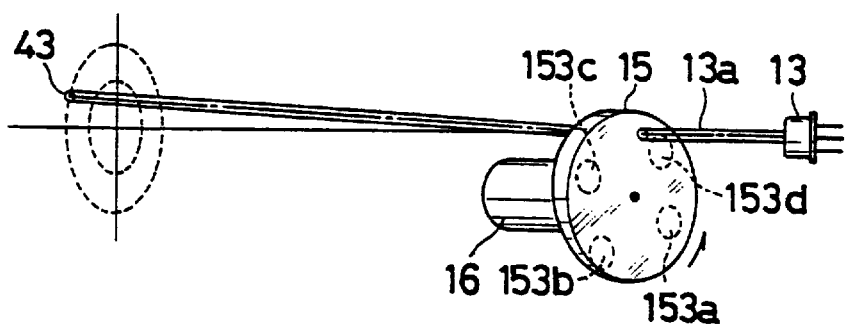
Figure 16:
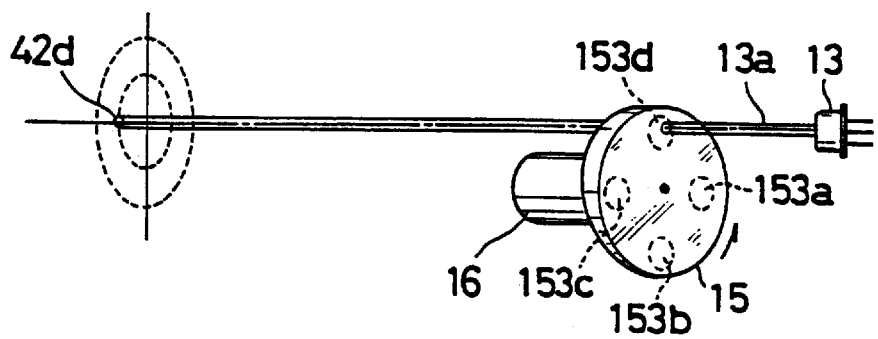
Figure 16:
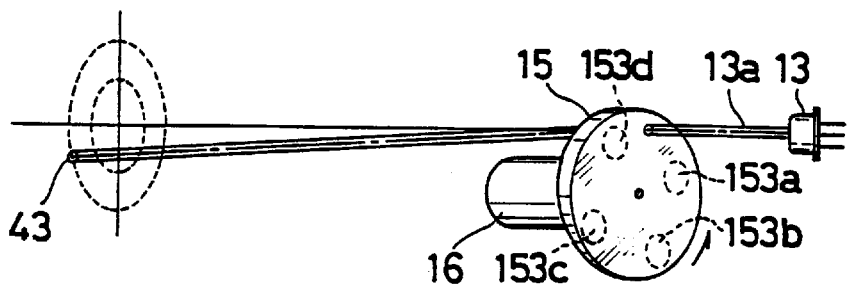

Next, a second variation of the optical member is described. FIG. 14. is a sectional view of the second optical member variation, FIG. 15 is a perspective view showing a projection image formed on a measurement object when the optical member 15 is rotated, and FIGS. 16A to 16E are diagram showing a propagation direction of the beam which changes as the optical member 15 is rotated. It should be noted that reflectors and the like are omitted from FIGS. 15 and 16 in order to simplify the description.

In the second variation, as shown in FIG. 15, the optical member 15 is formed by providing the optical prism as shown in FIG. 2 with recesses 153a, 153b, 153c and 153d in parts of a region where the beam 13a passes, i.e., positions on a circle having a rotary shaft 16a as a center and a distance between the rotary shaft 16a and the optical axis L2 as a radius (preferably the recesses are evenly circumferentially spaced).

Each of the recesses 153a to 153d has a bottom surface inclined by an angle j (<i) with respect to a plane normal to the optical axis L2 when the optical member 15 is in such a position as shown in FIG. 14 where its thickest portion is located at the upper end and its thinnest portion is located at the bottom end.

A propagation direction of the beam 13a from the light emitter 13 is described with reference to FIGS. 16A to 16E. When the beam 13a passes through the recess 153c of the optical member 15 as shown in FIG. 16A, a projection image is formed on a circle having a radius d1 from the center of the measurement area.

When the optical member 15 is rotated and the beam 13a passes beyond the recess 153c as shown in FIG. 16B, a projection image 43 is formed on a circle having a radius d2 (>d1) from the center of the measurement area. As the optical member 15 is rotated, the projection image 43 moves along the circle having the radius d2 as shown in FIG. 16C.

When the optical member 15 is further rotated to cause the beam 13a to pass through the recess 153d as shown in FIG. 16D, a projection image 42d is formed on the circle having the radius d1 from the center of the measurement area. At this time, the projection image 42d is formed in a position spaced from the position of the projection image 42c of FIG. 16A by 90°.

When the optical member 15 is rotated and the beam 13a passes beyond the recess 153d as shown in FIG. 16E, the projection image 43 is formed on the circle having the radius d2 from the center of the measurement area.

The optical member 15 is formed, in positions corresponding to the optical axis L2, with the recesses 153a to 153d each having the bottom surface inclined with respect to the plane normal to the optical axis L2 by angle j which is different from the angle of inclination i of the optical member 15. Accordingly, as shown in FIG. 15, concentric images comprised of the projection images 42a, 42b, 42c, 42d having the radius d1 and the projection image 43 having the radius d2 can be formed on the measurement object. Thus, even if the projection image is likely to be missed or is difficult to be confirmed as in the case that the color of the measurement object is very close to that of the beam, the projection image is more easily visible as compared with a spot projection image or a single ring-shaped projection image.

It should be noted that the angle of inclination j may be larger than i. In such a case, the projection image obtained by the beam 13a having passed through the recesses 153a to 153d is formed on a circle having a radius larger than the circle on which the projection image obtained by the beam 13a having passed through the optical member 15 other than the recesses 153a to 153d. Therefore, the projection image obtained by this arrangement looks quite similar to the one obtained by the aforementioned arrangement.

Figure 17:
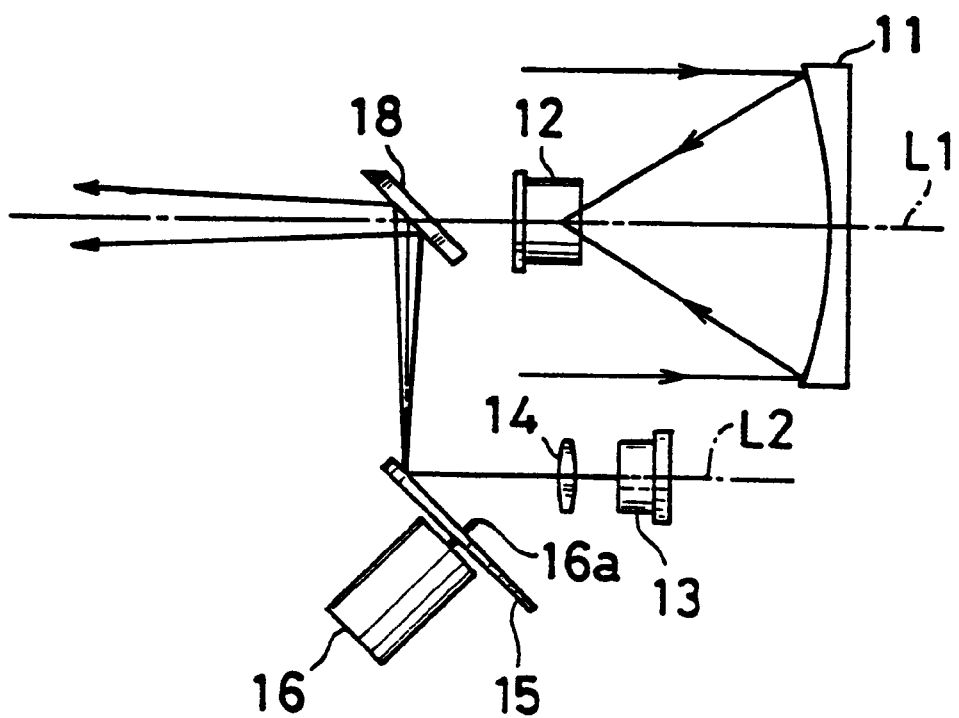
FIG. 17 is a schematic diagram showing a construction of a second modified projector.
Figure 18:
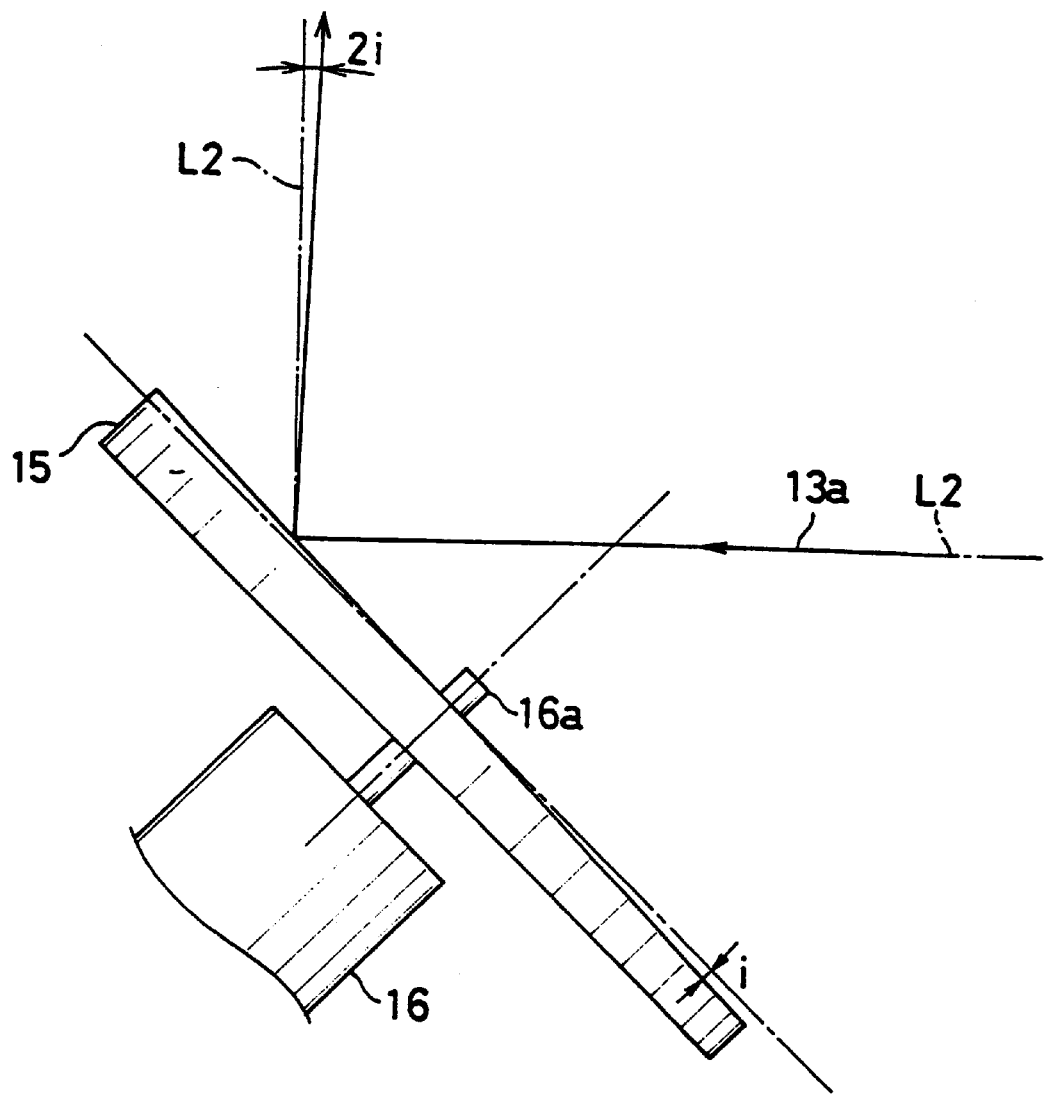
FIG. 18 is a schematic side diagram showing an arrangement of an optical member provided in the second modified projector.

Next, a second modified projector is described. FIG. 17 is a construction diagram of the second modified projector, and FIG. 18 is a schematic side diagram showing an arrangement of an optical member 15 in the second modified projector.

In the second modification, the optical member 15 is adapted as a reflector having the same configuration as the optical prism as shown in FIG. 2, and the reflector 17 is omitted. The motor 16 is disposed such that its rotary shaft 16a is inclined by 45° with respect to the optical axis L2. The reflecting surface of the optical member 15 is inclined by angle i with respect to a plane normal to the rotary shaft 16a in a state as shown in FIG. 18 where the thickest portion of the optical member 15 is at an upper end and the thinnest portion thereof is at a lower end.

The beam 13a is incident on the optical member 15 along the optical axis L2 as shown in FIG. 17 and is reflected by the surface of the optical member 15 to be incident on the reflector 18. At this time, in the state of FIG. 18, the beam 13a reflected by the reflecting surface of the optical member 15 forms an angle 2i with respect to the optical axis L2.

When the optical member 15 is rotated, the angle between the reflecting surface thereof and the plane normal to the rotary shaft 16a varies between −i and i. Accordingly, the reflected beam continuously moves in a range defined by angles −2i and 2i. Accordingly, an angle of projection of the beam to obtain a ring-shaped image is 4i with the optical axis L2 as an center.

In the second modification, since the reflector having the configuration as the optical prism shown in FIG. 2 is used as the optical member 15, the ring-shaped projection image indicative of the outline of the measurement area on the measurement object can be formed.

Similar to the first modification, one or more of planar portion having a reflecting surface normal to the rotary shaft 16a may be formed in parts of the area of the optical member 15 where the beam 13a passes so that the reflected beam 13a propagates along the optical axis L2. Then, the projection images indicative of the outline and the center of the measurement area can be formed on the measurement object as in the first modification. Further, similar to the first modification, an arrangement may be made such that the stop mode for stopping the rotation of the optical member 15 and the rotation mode are switchingly set.

Further, the optical member 15 may be formed, in positions of its area where the beam 13a passes, with a plurality of portions having a different angle of inclination. Then, the concentric ring-shaped projection images can be formed on the measurement object.

Figure 19A:
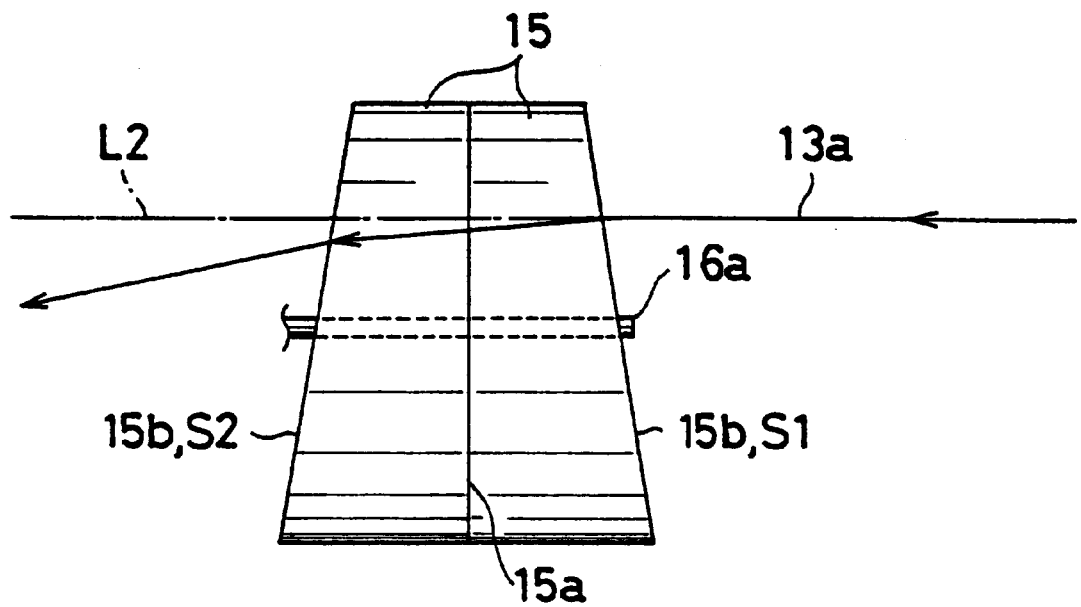
FIGS. 19A and 19B are diagrams showing a configuration of an optical member provided a third modified projector.
Figure 19B:
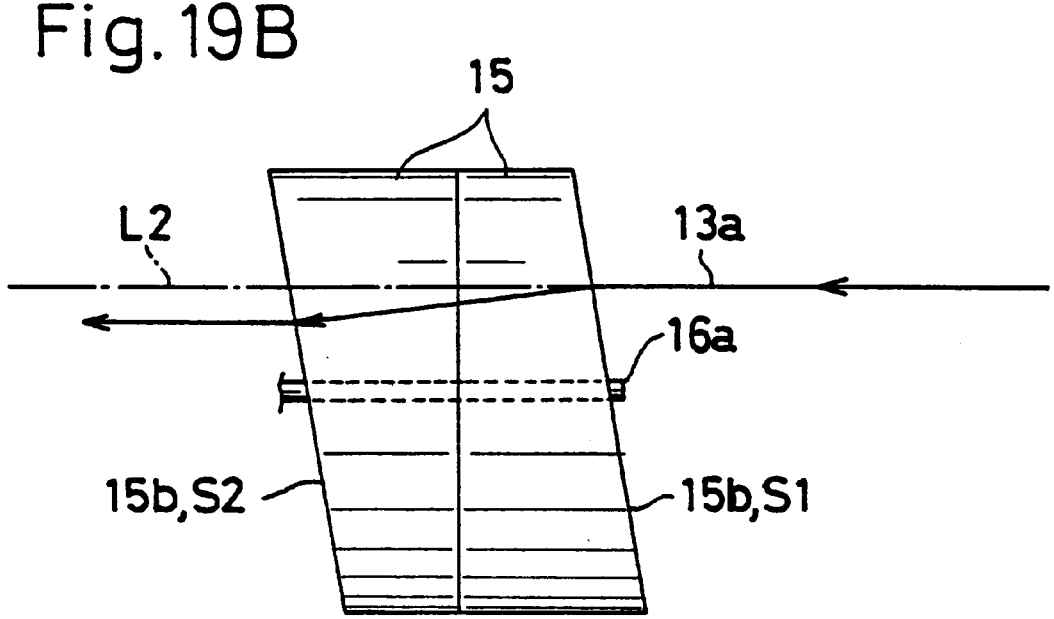

Next, a third modified projector is described. FIGS. 19A and 19B are diagrams showing an optical member 15 of the third modified projector.

In the third modification, there are provided two, i.e., first and second optical member 15A, 15B. The optical members 15A, 15B have the same configuration as the transparent optical prism shown in FIG. 2, respectively, and are mounted on the rotary shaft 16a. such that their principle planes 15a normal to the optical axis L2 are joined. The first optical member 15A is secured to the rotary shaft 16a, whereas the second optical member 15B is rotatably mounted on the rotary shaft 16a and is provided with an unillustrated securing member for securing the second optical member 15B to the first optical member 15A. Thus, the optical members 15A, 15B have changeable relative rotational positions and are integrally rotatable. There may be provided a relative position changing member for automatically changing and fixing the relative rotational position of the optical members 15A, 15B. Further, a fine clearance may be provided between the optical members 15A and 15B so as to facilitate the relative rotation.

A propagation direction of the beam 13a in the third modified projector is described with reference to FIGS. 19A and 19B. In the case that the optical members 15A, 15B are symmetrically secured to each other with respect to the normal plane as shown in FIG. 19A, the beam 13a incident on the first optical member 15A along the optical axis L2 is refracted at its incidence surface S1 (principle plane 15b of the first optical member 15A), and further refracted at an emergence surface S2 (principle plane 15b of the second optical member 15B) when emerging out of the second optical member 15B after having propagated in the optical members 15. At this time, since the incidence surface S1 and the emergence surface S2 are inclined in opposite directions with respect to the optical axis L2, an angle of the outgoing beam 13a with respect to the optical axis L2 is about twice as large as in the case where only a single optical member 15 is used.

On the other hand, in the case that the optical members 15A, 15B are secured as shown in FIG. 19B by rotating the second optical member 15B with respect to the first optical member 15A from the state of FIG. 19A, the beam 13a incident on the first optical member 15A along-the optical axis L2 is refracted at the incident surface S1 of the first optical member 15A and at the emergence surface S2 of the second optical member 15B as in the case of FIG. 19A. However, since the incident surface S1 and the emergence surface S2 are inclined in the same direction with respect to the optical axis L2, angles of refraction are offset. As a result, the beam 13a emerges out of the second optical member 15B in parallel with the optical axis L2.

Accordingly, if the optical members 15A, 15B are integrally rotated, a ring-shaped projection image having a maximum radius is formed on the measurement object in the case of FIG. 19A, whereas a ring-shaped projection image having a minimum radius which is equal to a distance displaced by refraction is formed thereon in the case of FIG. 19B.

If the relative rotational position of the optical members 15A, 15B is set at an intermediate state between the position of FIG. 19A and the position of FIG. 19B, a ring-shaped projection image having a radius between the minimum and maximum radii depending upon an angle of emergence from the second optical member 15B is formed on the measurement object. For example, if the optical members 15A, 15B are relatively rotated by 90 or 270°, a ring-shaped projection image having a radius substantially equal to the radius of the ring-shaped projection image obtained in the case where a single optical member 15 is employed, i.e., in the case of the basic embodiment, is formed on the measurement object.

In the third modification, the normal surfaces of the optical members 16A, 15B having the same configuration as the optical prism shown in FIG. 2 are joined and their relative rotational positions are made changeable. Accordingly, the angle of emergence of the beam 13a can be changed, thereby making it possible to change the radius of the ring-shaped projection image to be formed on the measurement object.

The optical members 15A, 15B may be secured to rotary shafts of separate motors, and may be rotated at the same speed, by coaxially arranging these rotary shafts. Such an arrangement makes it easier to change the relative rotational positions of the optical members 15A, 15B.

Figure 20:
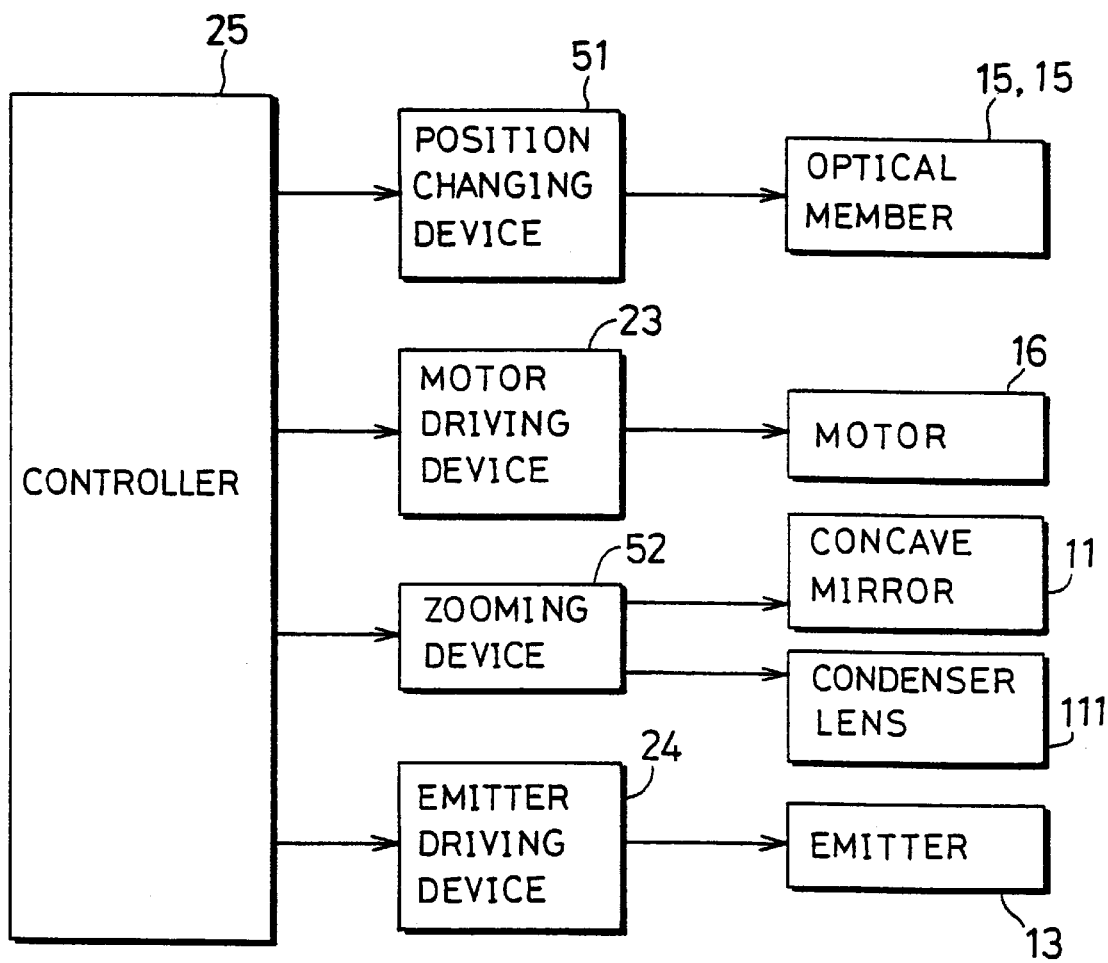
FIG. 20 is a block diagram showing a construction of a control system of a second radiation thermometer provided with the third modified projector.
Figure 21:
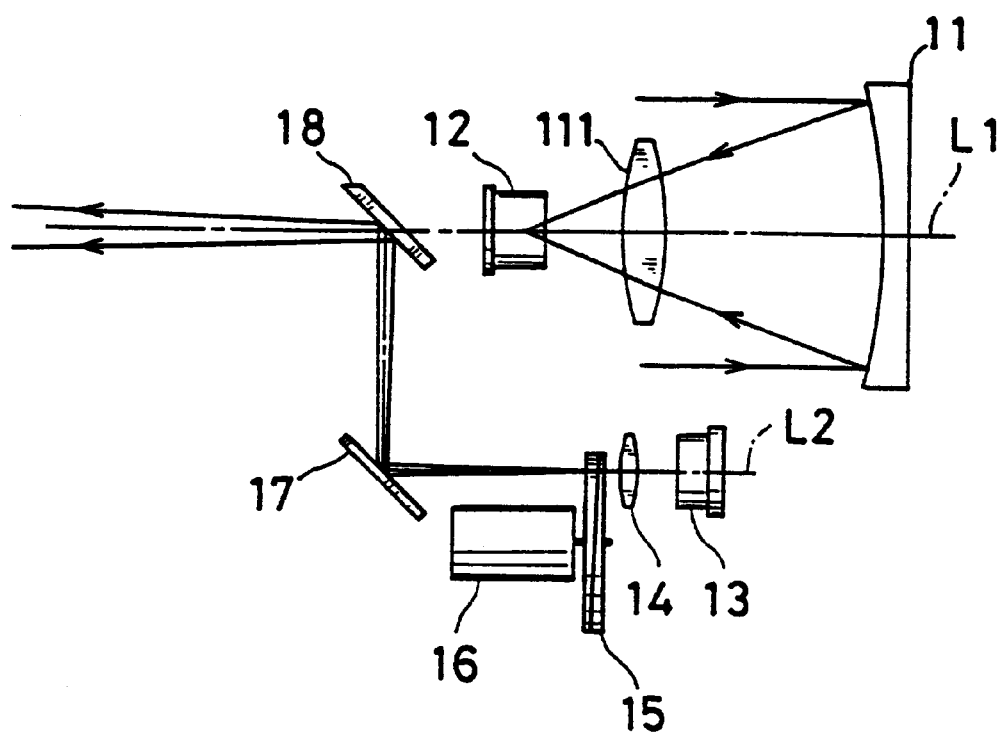
FIG. 21 is a schematic diagram showing a state of the second radiation thermometer that an optical system is set at a middle focal length.
Figure 22:
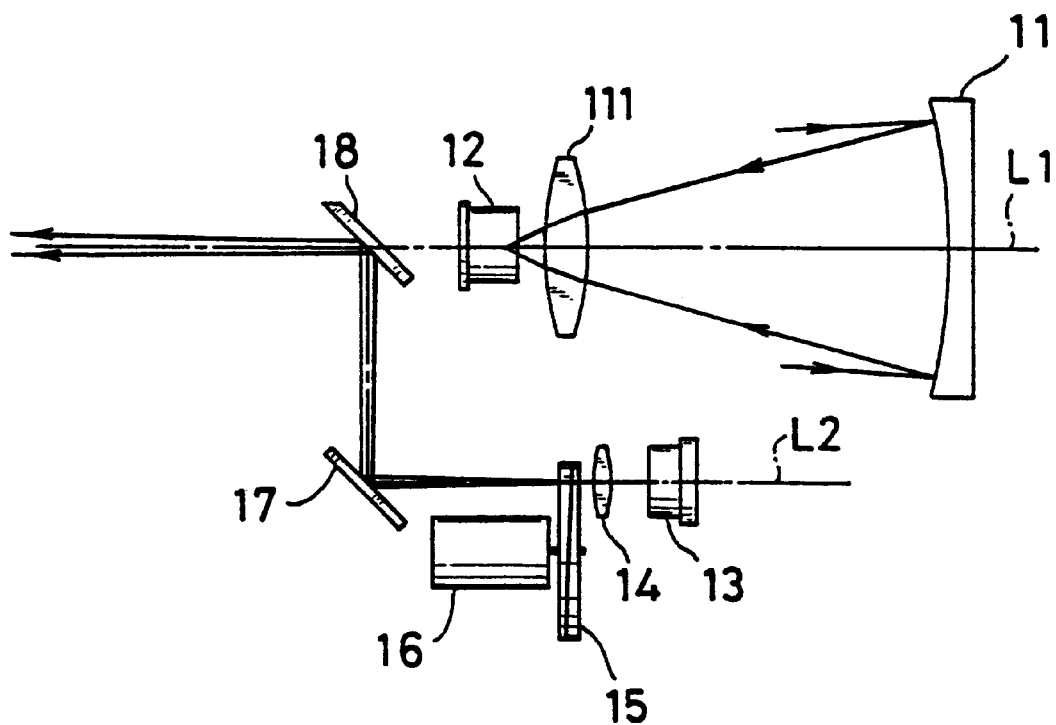
FIG. 22 is a schematic diagram showing a state of the second radiation thermometer that the optical system is set at a telephoto limit focal length.
Figure 23:
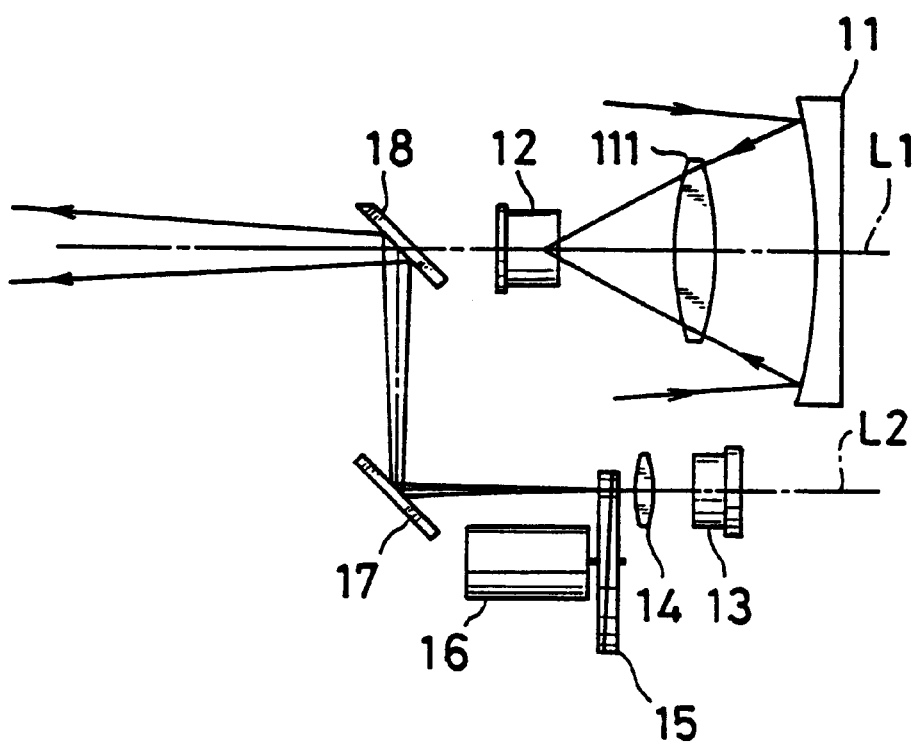
FIG. 23 is a schematic diagram showing a state of the second radiation thermometer that the optical system is set at a wide-angle limit focal length.

Next, a second radiation thermometer provided with the third modified projector is described. FIG. 20 is a block diagram showing a construction of a control system of the second radiation thermometer, and FIGS. 21 to 23 are diagrams showing three states of the second radiation thermometer, respectively.

In the second radiation thermometer, the optical members 15A, 15B of the third modified projector are used. As shown in FIG. 21, a condenser lens 111 is disposed on the optical axis L1 between the concave mirror 11 and the infrared sensor 12. The condenser lens 111 and the concave mirror 11 which form a measurement optical system are movably arranged along the optical axis L1 to make their relative distances to the infrared sensor 12 changeable. In other words, the measurement optical system is provided with a zooming function. FIGS. 21 to 23 show different zoomed states. The measurement system has a medium focal length, a telephoto focal length and a wide-angle focal length in FIGS. 21 to 23, respectively. Thus, the measurement system is capable of changing an area on the measurement object where the converged radiated energy is projected, i.e., the size of the measurement area.

Referring to FIG. 20 showing the control system of the second radiation thermometer, a relative position changing device 51 changes and fixes the relative rotational positions of the optical members 16A, 15B. A zooming device 52 changes the relative distances of the concave mirror 11 and the condenser lens 111 to the infrared sensor 12 by moving the concave mirror 11 and the condenser lens 111.

A controller 25 outputs a control signal to the zooming device 52, causing it to move the concave mirror 11 and the condenser lens 111 in order to control the size of the measurement area on the measurement object, and outputs a control signal to the relative position changing device 51 in accordance with the size of the measurement area in order to control the relative rotational positions of the optical members 15A, 15B.

By adopting the above construction, the radius of the ring-shaped projection image can be changed according to the size of the measurement area on the measurement object by changing the relative rotational positions of the optical elements 15A, 15B in accordance with the zooming of the measurement optical system. Accordingly, the outline of the measurement area can be accurately indicated even if the size thereof is changed by zooming.

Although the projector according to the invention is applied to a radiation thermometer in the foregoing embodiments, it is also applicable to distance measuring equipment, luminance measuring equipment or like measuring equipment for remotely measuring an object or a variety of optical equipment which require a projector.

As described above, the optical member is located on the optical axis along which the converged visible light beam is emitted. As the rotation, the optical member causes the direction of the converged visible light to be continuously refracted with respect to the optical axis. Accordingly, comparing to the conventional projector including the mechanism for mechanically rotating the laser beam source about an optical axis, the construction of the inventive projector is simpler.

Also, the converged visible light is reflected with respect to the optical axis. Comparing to the conventional projector which produces a ring-shaped projection image indicating a measurement area by rotating a reflector to reflect a light beam with respect to an optical axis different from the optical axis along which the light beam is emitted, thus, the inventive projector can produce a ring-shaped projection image indicating a measurement area more accurately.

Further, this optical member is formed with a nonrefractive portion in a part of its area where the optical axis of the projector optical system passes, so that the converged visible light propagates along the optical axis of the projector optical system. Accordingly, the ring-shaped projection image indicative of the outline of the measurement area and the spot projection image indicative of the center of the measurement area can be formed on the measurement object, thereby enabling an operator to simultaneously confirm the entirety and center of the measurement area. Therefore, the optic axes of the radiation thermometer can be accurately adjusted.

Further, the rotation mode for rotating the optical member and the stop mode for stopping the rotation of the optical member when the nonrefractive portion is located on the optical axis of the projector optical system are switchably settable. Accordingly, if, for example, the measurement object is at a short distance, the measurement area can be more accurately confirmed by forming the ring-shaped projection image indicative of the outline of the measurement area and the spot projection image indicative of the center of the measurement area. Further, if the measurement object is at a long distance, the converged visible light can reach the measurement object by forming only the spot projection image.

Further, the optical member which causes the direction of the converged visible light to continuously refract at a first angle with respect to the optical axis of the projector optical system by its rotation is formed with a refractive portion in a part of its area where the optical axis of the projector optical system passes, so that the direction of the converged visible light is refracted at a second angle different from the first angle. Accordingly, concentric ring-shaped projection images can be formed on the measurement object, thereby making the projection image more easily confirmable.

Furthermore, there are provided first and second optical prisms for continuously refracting the direction of the converged visible light with respect to the optical axis of the projector optical system by their rotation, and a relative rotational position changing device for changing relative rotational positions of the first and second optical prisms. Accordingly, the size of the ring-shaped projection image to be formed on the measurement object can be changed by changing the relative rotational positions of the first and second optical prisms. This enables the radiation thermometer to deal with measurement objects of different sizes.

In the case that the measurement optical system has a zooming function, the size of the projection image can be changed as the measurement area of the measurement object is changed by the zooming of the measurement optical system.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A projector, for use in a measuring device, comprising:
   an emitter which emits a beam of visible light to a measurement object along a predetermined optical axis;
   a rotary optical member which is operable to change the propagation direction of the visible light beam with respect to the predetermined optical axis in accordance with rotation of the rotary optical member, wherein the rotary optical member is operable to reflect the visible light beam, and is formed with a reflective portion operable to reflect the visible light beam emanating therefrom at a slightly inclined angle with respect to a fixed axis normal to the predetermined optical axis, wherein the rotary optical member includes a first planar surface disposed normal to the rotation axis and wherein the reflective portion is defined by an opposing planar reflective surface arranged in a manner that is not parallel to the first planar surface; and
   a driver which rotates the rotary optical member about a rotation axis.

2. A projector, for use in a measuring device, comprising:
   an emitter which emits a beam of visible light to a measurement object along a predetermined optical axis;
   a rotary optical member which is operable to change the propagation direction of the visible light beam with respect to the predetermined optical axis in accordance with rotation of the rotary optical member, wherein the rotary optical member is operable to reflect the visible light beam, and is formed with a reflective portion operable to reflect the visible light beam such that the visible light beam traces the shape of a cone centered along a fixed axis normal to the predetermined optical axis, wherein the rotary optical member includes a first planar surface disposed normal to the rotation axis and wherein the reflective portion is defined by an opposing planar reflective surface arranged in a manner that is not parallel to the first planar surface; and a driver which rotates the rotary optical member about a rotation axis.

* * * * *